(12) United States Patent
Huang et al.

(10) Patent No.: US 12,363,719 B2
(45) Date of Patent: Jul. 15, 2025

(54) TECHNIQUES FOR SELECTING SPATIAL RELATION INFORMATION FOR SIMULTANEOUS PHYSICAL UPLINK CONTROL CHANNEL RESOURCES ACROSS MULTIPLE COMPONENT CARRIERS

(71) Applicant: QUALCOMM Incorporated, San Diego, CA (US)

(72) Inventors: Yi Huang, San Diego, CA (US); Yan Zhou, San Diego, CA (US); Tao Luo, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 17/727,239

(22) Filed: Apr. 22, 2022

(65) Prior Publication Data

US 2023/0015378 A1 Jan. 19, 2023

Related U.S. Application Data

(60) Provisional application No. 63/218,801, filed on Jul. 6, 2021.

(51) Int. Cl.
*H04W 72/21* (2023.01)
*H04L 5/00* (2006.01)

(52) U.S. Cl.
CPC ............ *H04W 72/21* (2023.01); *H04L 5/001* (2013.01)

(58) Field of Classification Search
None
See application file for complete search history.

(56) References Cited

U.S. PATENT DOCUMENTS

2018/0317214 A1* 11/2018 Ding ................. H04B 7/0695
2020/0177266 A1* 6/2020 Kang ................. H04L 5/0055
(Continued)

FOREIGN PATENT DOCUMENTS

WO  WO-2020072893 A1   4/2020
WO  WO-2020243505 A1   12/2020

OTHER PUBLICATIONS

International Search Report and Written Opinion—PCT/US2022/034830—ISA/EPO—Oct. 17, 2022 (2105968WO).

*Primary Examiner* — Lonnie V Sweet
(74) *Attorney, Agent, or Firm* — Holland & Hart LLP

(57) ABSTRACT

Methods, systems, and devices for wireless communications are described. In some systems, a user equipment (UE) may receive one or more messages scheduling a first uplink transmission over a first physical uplink control channel (PUCCH) resource on a first component carrier and a second uplink transmission over a second PUCCH resource on a second component carrier and, if the first PUCCH resource and the second PUCCH resource overlap in time, the UE 115 may transmit the first uplink transmission and the second uplink transmission using spatial relation information in accordance with a spatial relation configuration that is dedicated for selecting spatial relation information for simultaneous PUCCH transmissions on different component carriers. A network entity may configure the UE with spatial relation information for the overlapping PUCCH resources and the UE may select spatial relation information to use for the simultaneous uplink transmissions in accordance with the spatial relation configuration.

28 Claims, 18 Drawing Sheets

(56) References Cited

U.S. PATENT DOCUMENTS

| | | | |
|---|---|---|---|
| 2020/0229104 A1* | 7/2020 | MolavianJazi | H04W 52/146 |
| 2021/0400668 A1* | 12/2021 | Matsumura | H04L 5/003 |
| 2021/0410165 A1* | 12/2021 | Xiong | H04L 5/001 |
| 2022/0060293 A1* | 2/2022 | Matsumura | H04L 5/0053 |
| 2022/0287020 A1* | 9/2022 | Park | H04B 7/0695 |
| 2024/0137937 A1* | 4/2024 | Matsumura | H04L 5/0023 |

* cited by examiner

TECHNIQUES FOR SELECTING SPATIAL RELATION INFORMATION FOR SIMULTANEOUS PHYSICAL UPLINK CONTROL CHANNEL RESOURCES ACROSS MULTIPLE COMPONENT CARRIERS

CROSS REFERENCE

The present application for patent claims the benefit of U.S. Provisional Patent Application No. 63/218,801 by HUANG et al., entitled "TECHNIQUES FOR SELECTING SPATIAL RELATION INFORMATION FOR SIMULTANEOUS PHYSICAL UPLINK CONTROL CHANNEL RESOURCES ACROSS MULTIPLE COMPONENT CARRIERS," filed Jul. 6, 2021, assigned to the assignee hereof, and expressly incorporated by reference herein.

FIELD OF TECHNOLOGY

The following relates to wireless communications, including techniques for selecting spatial relation information for simultaneous physical uplink control channel (PUCCH) resources across multiple component carriers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a UE may be capable of directional communication and may communicate with one or more other devices via a directional communication beam.

SUMMARY

The described techniques relate to improved methods, systems, devices, and apparatuses that support techniques for selecting spatial relation information for simultaneous physical uplink control channel (PUCCH) resources across multiple component carriers. For example, a user equipment (UE) may receive a configuration of PUCCH resources that are located on or are otherwise associated with multiple component carriers and, in some examples, the UE may receive one or more messages that schedule multiple uplink transmissions over simultaneous PUCCH resources on different component carriers. Each PUCCH resource may be associated with a spatial relation information and, in some implementations, the UE may select spatial relation information for the multiple PUCCH resources over which the UE transmits the multiple uplink transmissions based on the spatial relation information associated with each PUCCH resource and in accordance with a spatial relation configuration for simultaneous uplink transmissions over PUCCH resources spanning multiple component carriers. In other words, such a spatial relation configuration may define a spatial relation information selection rule according to which the UE may select spatial relation information for simultaneous PUCCH transmissions.

A method for wireless communication at a UE is described. The method may include receiving, from a network entity (e.g., a base station), signaling indicating spatial relation information associated with a set of multiple uplink control channel resources, where the set of multiple uplink control channel resources span a set of multiple component carriers, receiving, from the network entity, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time, and transmitting, based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

An apparatus for wireless communication at a UE is described. The apparatus may include a processor, memory coupled with the processor, and instructions stored in the memory. The instructions may be executable by the processor to cause the apparatus to receive, from a network entity, signaling indicating spatial relation information associated with a set of multiple uplink control channel resources, where the set of multiple uplink control channel resources span a set of multiple component carriers, receive, from the network entity, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time, and transmit, based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

Another apparatus for wireless communication at a UE is described. The apparatus may include means for receiving, from a network entity, signaling indicating spatial relation information associated with a set of multiple uplink control channel resources, where the set of multiple uplink control channel resources span a set of multiple component carriers, means for receiving, from the network entity, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time, and means for transmitting, based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

A non-transitory computer-readable medium storing code for wireless communication at a UE is described. The code may include instructions executable by a processor to receive, from a network entity, signaling indicating spatial relation information associated with a set of multiple uplink control channel resources, where the set of multiple uplink control channel resources span a set of multiple component carriers, receive, from the network entity, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time, and transmit, based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

In some examples of the method, apparatuses, and non-transitory computer-readable medium described herein, receiving the signaling indicating the spatial relation information associated with the set of multiple uplink control channel resources may include operations, features, means, or instructions for receiving an indication of a same spatial relation information for both the first uplink control channel resource and the second uplink control channel resource based on the spatial relation configuration and as a result of the first uplink control channel resource and the second uplink control channel resource overlapping in time.

In some examples of the method, apparatuses, and non-transitory computer-readable medium described herein, transmitting the first uplink transmission over the first uplink control channel resource and the second uplink transmission over the second uplink control channel resource may include operations, features, means, or instructions for transmitting the first uplink transmission over the first uplink control channel resource and the second uplink transmission over the second uplink control channel resource via a same directional beam associated with the same spatial relation information.

In some examples of the method, apparatuses, and non-transitory computer-readable medium described herein, the spatial relation configuration defines that uplink control channel resources of the set of multiple uplink control channel resources that overlap in time and may be associated with different component carriers may be configured with same spatial relation information.

In some examples of the method, apparatuses, and non-transitory computer-readable medium described herein, receiving the signaling indicating the spatial relation information associated with the set of multiple uplink control channel resources may include operations, features, means, or instructions for receiving an indication of a first spatial relation information for the first uplink control channel resource and a second spatial relation information for the second uplink control channel resource.

Some examples of the method, apparatuses, and non-transitory computer-readable medium described herein may further include operations, features, means, or instructions for selecting the first spatial relation information for both the first uplink control channel resource and the second uplink control channel resource based on the spatial relation configuration and as a result of the first uplink control channel resource and the second uplink control channel resource overlapping in time, where transmitting the first uplink transmission over the first uplink control channel resource and the second uplink transmission over the second uplink control channel resource may be based on selecting the first spatial relation information for both the first uplink control channel resource and the second uplink control channel resource.

In some examples of the method, apparatuses, and non-transitory computer-readable medium described herein, transmitting the first uplink transmission over the first uplink control channel resource and the second uplink transmission over the second uplink control channel resource may include operations, features, means, or instructions for transmitting the first uplink transmission over the first uplink control channel resource and the second uplink transmission over the second uplink control channel resource via a directional beam associated with the first spatial relation information.

In some examples of the method, apparatuses, and non-transitory computer-readable medium described herein, the spatial relation configuration defines a priority for each of the set of multiple component carriers, and the first spatial relation information may be selected as a result of the first component carrier associated with the first uplink control channel resource having a relatively higher priority than the second component carrier associated with the second uplink control channel resource.

Some examples of the method, apparatuses, and non-transitory computer-readable medium described herein may further include operations, features, means, or instructions for transmitting, to the network entity, signaling indicating a mapping between a first set of spatial relation information including the first spatial relation information and a first antenna panel of the UE and between a second set of spatial relation information including the second spatial relation information and a second antenna panel of the UE, where receiving the indication of the first spatial relation information for the first uplink control channel resource and the second spatial relation information for the second uplink control channel resource may be based on the mapping.

In some examples of the method, apparatuses, and non-transitory computer-readable medium described herein, transmitting the first uplink transmission over the first uplink control channel resource and the second uplink transmission over the second uplink control channel resource may include operations, features, means, or instructions for transmitting the first uplink transmission over the first uplink control channel resource via a first directional beam associated with the first spatial relation information and transmitting the second uplink transmission over the second uplink control channel resource via a second directional beam associated with the second spatial relation information.

In some examples of the method, apparatuses, and non-transitory computer-readable medium described herein, receiving the signaling indicating the spatial relation information associated with the set of multiple uplink control channel resources may include operations, features, means, or instructions for receiving an indication of one or more fallback spatial relation information corresponding to the spatial relation configuration, each fallback spatial relation information for at least one slot of a number of slots.

Some examples of the method, apparatuses, and non-transitory computer-readable medium described herein may further include operations, features, means, or instructions for selecting a first fallback spatial relation information for both the first uplink control channel resource and the second uplink control channel resource based on the spatial relation configuration and as a result of the first uplink control channel resource and the second uplink control channel resource overlapping in a first slot, where transmitting the first uplink transmission over the first uplink control channel resource and the second uplink transmission over the second uplink control channel resource may be based on selecting the first fallback spatial relation information for both the first uplink control channel resource and the second uplink control channel resource.

In some examples of the method, apparatuses, and non-transitory computer-readable medium described herein, transmitting the first uplink transmission over the first uplink control channel resource and the second uplink transmission over the second uplink control channel resource may include operations, features, means, or instructions for transmitting the first uplink transmission over the first uplink control channel resource and the second uplink transmission over the second uplink control channel resource via a directional beam associated with the first fallback spatial relation information.

Some examples of the method, apparatuses, and non-transitory computer-readable medium described herein may further include operations, features, means, or instructions for transmitting, to the network entity, a capability report indicating one or both of a first one or more pairs of uplink control channel resources over which the UE may be capable of simultaneous uplink transmissions using different spatial relation information or a second one or more pairs of uplink control channel resources over which the UE may be incapable of simultaneous uplink transmissions using different spatial relation information, where receiving one or both of the signaling or the one or more messages scheduling the first uplink transmission and the second uplink transmission may be based on the capability report.

A method for wireless communication at a network entity is described. The method may include transmitting, to a UE, signaling indicating spatial relation information associated with a set of multiple uplink control channel resources, where the set of multiple uplink control channel resources span a set of multiple component carriers, transmitting, to the UE, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time, and receiving, via one or more components of the network entity and based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

An apparatus for wireless communication at a network entity is described. The apparatus may include a processor, memory coupled with the processor, and instructions stored in the memory. The instructions may be executable by the processor to cause the apparatus to transmit, to a UE, signaling indicating spatial relation information associated with a set of multiple uplink control channel resources, where the set of multiple uplink control channel resources span a set of multiple component carriers, transmit, to the UE, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time, and receive, via one or more components of the network entity and based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

Another apparatus for wireless communication at a network entity is described. The apparatus may include means for transmitting, to a UE, signaling indicating spatial relation information associated with a set of multiple uplink control channel resources, where the set of multiple uplink control channel resources span a set of multiple component carriers, means for transmitting, to the UE, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time, and means for receiving, via one or more components of the network entity and based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

A non-transitory computer-readable medium storing code for wireless communication at a network entity is described. The code may include instructions executable by a processor to transmit, to a UE, signaling indicating spatial relation information associated with a set of multiple uplink control channel resources, where the set of multiple uplink control channel resources span a set of multiple component carriers, transmit, to the UE, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time, and receive, via one or more components of the network entity and based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

In some examples of the method, apparatuses, and non-transitory computer-readable medium described herein, transmitting the signaling indicating the spatial relation information associated with the set of multiple uplink control channel resources may include operations, features, means, or instructions for transmitting an indication of a same spatial relation information for both the first uplink control channel resource and the second uplink control channel resource based on the spatial relation configuration and as a result of the first uplink control channel resource and the second uplink control channel resource overlapping in time.

In some examples of the method, apparatuses, and non-transitory computer-readable medium described herein, receiving the first uplink transmission over the first uplink control channel resource and the second uplink transmission over the second uplink control channel resource may include operations, features, means, or instructions for receiving the first uplink transmission over the first uplink control channel resource and the second uplink transmission over the second uplink control channel resource via a same directional beam associated with the same spatial relation information.

In some examples of the method, apparatuses, and non-transitory computer-readable medium described herein, the spatial relation configuration defines that uplink control channel resources of the set of multiple uplink control channel resources that overlap in time and may be associated with different component carriers may be configured with same spatial relation information.

In some examples of the method, apparatuses, and non-transitory computer-readable medium described herein, transmitting the signaling indicating the spatial relation information associated with the set of multiple uplink control channel resources may include operations, features, means, or instructions for transmitting an indication of a first spatial relation information for the first uplink control channel resource and a second spatial relation information for the second uplink control channel resource.

Some examples of the method, apparatuses, and non-transitory computer-readable medium described herein may further include operations, features, means, or instructions for selecting the first spatial relation information for both the first uplink control channel resource and the second uplink control channel resource based on the spatial relation configuration and as a result of the first uplink control channel resource and the second uplink control channel resource overlapping in time, where receiving the first uplink transmission over the first uplink control channel resource and the second uplink transmission over the second uplink control channel resource may be based on selecting the first spatial relation information for both the first uplink control channel resource and the second uplink control channel resource.

In some examples of the method, apparatuses, and non-transitory computer-readable medium described herein, receiving the first uplink transmission over the first uplink control channel resource and the second uplink transmission over the second uplink control channel resource may include operations, features, means, or instructions for receiving the first uplink transmission over the first uplink control channel resource and the second uplink transmission over the second uplink control channel resource via a directional beam associated with the first spatial relation information.

In some examples of the method, apparatuses, and non-transitory computer-readable medium described herein, the spatial relation configuration defines a priority for each of the set of multiple component carriers, and the first spatial relation information may be selected as a result of the first component carrier associated with the first uplink control channel resource having a relatively higher priority than the second component carrier associated with the second uplink control channel resource.

Some examples of the method, apparatuses, and non-transitory computer-readable medium described herein may further include operations, features, means, or instructions for receiving, from the UE, signaling indicating a mapping between a first set of spatial relation information including the first spatial relation information and a first antenna panel of the UE and between a second set of spatial relation information including the second spatial relation information and a second antenna panel of the UE, where transmitting the indication of the first spatial relation information for the first uplink control channel resource and the second spatial relation information for the second uplink control channel resource may be based on the mapping.

In some examples of the method, apparatuses, and non-transitory computer-readable medium described herein, receiving the first uplink transmission over the first uplink control channel resource and the second uplink transmission over the second uplink control channel resource may include operations, features, means, or instructions for receiving, via a first component of the one or more components of the network entity, the first uplink transmission over the first uplink control channel resource via a first directional beam associated with the first spatial relation information and receiving, via a second component of the one or more components of the network entity, the second uplink transmission over the second uplink control channel resource via a second directional beam associated with the second spatial relation information.

In some examples of the method, apparatuses, and non-transitory computer-readable medium described herein, transmitting the signaling indicating the spatial relation information associated with the set of multiple uplink control channel resources may include operations, features, means, or instructions for transmitting an indication of one or more fallback spatial relation information corresponding to the spatial relation configuration, each fallback spatial relation information for at least one slot of a number of slots.

Some examples of the method, apparatuses, and non-transitory computer-readable medium described herein may further include operations, features, means, or instructions for selecting a first fallback spatial relation information for both the first uplink control channel resource and the second uplink control channel resource based on the spatial relation configuration and as a result of the first uplink control channel resource and the second uplink control channel resource overlapping in a first slot, where receiving the first uplink transmission over the first uplink control channel resource and the second uplink transmission over the second uplink control channel resource may be based on selecting the first fallback spatial relation information for both the first uplink control channel resource and the second uplink control channel resource.

In some examples of the method, apparatuses, and non-transitory computer-readable medium described herein, receiving the first uplink transmission over the first uplink control channel resource and the second uplink transmission over the second uplink control channel resource may include operations, features, means, or instructions for receiving the first uplink transmission over the first uplink control channel resource and the second uplink transmission over the second uplink control channel resource via a directional beam associated with the first fallback spatial relation information.

Some examples of the method, apparatuses, and non-transitory computer-readable medium described herein may further include operations, features, means, or instructions for receiving, from the UE, a capability report indicating one or both of a first one or more pairs of uplink control channel resources over which the UE may be capable of simultaneous uplink transmissions using different spatial relation information and a second one or more pairs of uplink control channel resources over which the UE may be incapable of simultaneous uplink transmissions using different spatial relation information, where transmitting one or both of the signaling or the one or more messages scheduling the first uplink transmission and the second uplink transmission may be based on the capability report.

DETAILED DESCRIPTION

Figure 1:
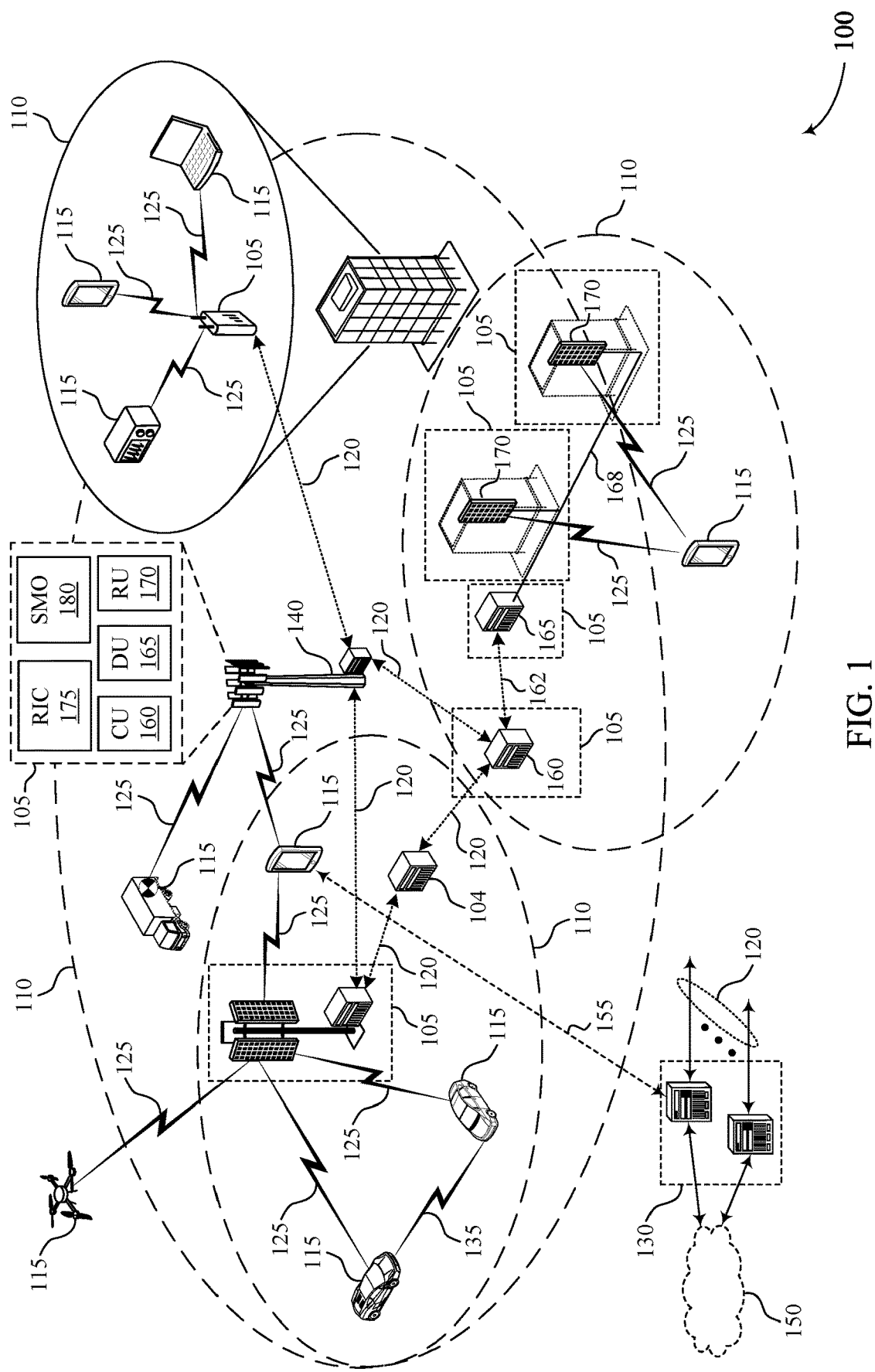
FIGS. 1 and 2 illustrate examples of wireless communications systems that support techniques for selecting spatial relation information for simultaneous physical uplink control channel (PUCCH) resources across multiple component carriers in accordance with examples of the present disclosure.

In some wireless communications systems, a user equipment (UE) may be capable of directional communication and may communicate with one or more other devices via a directional communication beam. A directional communication beam may be associated with or correspond to a spatial relation and, in some examples, the UE may receive spatial relation information for each of a number of resources over which the UE may transmit. For example, the UE may receive a spatial relation information configuration indicating spatial relation information for each of a number of physical uplink control channel (PUCCH) resources such that the UE may transmit over a PUCCH resource via a directional beam that is associated with a spatial relation information configured for that PUCCH resource.

Additionally, in some examples, the UE may employ carrier aggregation and may communicate with multiple cells on multiple component carriers. For example, the UE may communicate with a primary cell (PCell) on a primary component carrier (PCC) and may communicate with one or more secondary cells (SCells) on one or more secondary component carriers (SCCs). In some examples, the UE may be capable of PUCCH transmissions over different component carriers and may switch between different component carriers over time for PUCCH transmissions. As such, in some scenarios, the UE may receive one or more messages scheduling uplink transmissions over PUCCH resources that overlap in time and are located on different component carriers. For example, the UE may receive one or more messages scheduling a first uplink transmission over a first PUCCH resource on a first component carrier and a second uplink transmission over a second PUCCH resource on a second component carrier and, in such scenarios, the first PUCCH resource and the second PUCCH resource may overlap in time. In such examples, the UE may be unaware of how to select spatial relation information for the simultaneous PUCCH transmissions across multiple component carriers, which may result in ambiguity between the UE and one or more receiving devices.

In some implementations of the present disclosure, the UE may select spatial relation information for uplink transmissions over simultaneous PUCCH resources spanning (e.g., such as located on, configured for, or otherwise associated with) multiple component carriers in accordance with a spatial relation configuration. Such a spatial relation configuration may include or refer to a dedicated configuration according to which the UE may select spatial relation information for uplink transmissions in examples in which the uplink transmissions are scheduled for overlapping PUCCH resources on different component carriers. In some implementations, the UE may select a same spatial relation information for both the first uplink transmission over the first PUCCH resource and the second uplink transmission over the second PUCCH resource. In such implementations, the UE may select the same spatial relation information for each uplink transmission as a result of being configured with same spatial relation information for simultaneous PUCCH resources on different component carriers, as a result of selecting a spatial relation information associated with a PUCCH resource that is located on a relatively higher priority component carrier, or as a result of selecting a fallback spatial relation information that is configured for simultaneous PUCCH transmissions on different component carriers.

In some other implementations, the UE may select different spatial relation information for the first uplink transmission over the first PUCCH resource and the second uplink transmission over the second PUCCH resource. In such implementations, the UE may select different spatial relation information for each uplink transmission as a result of providing a serving network entity with a mapping between spatial relation information and antenna panels of the UE. For example, based on receiving the mapping, the serving network entity may refrain from scheduling simultaneous PUCCH transmissions that are associated with spatial relation information mapping to a same antenna panel of the UE.

Particular implementations of the subject matter described in this disclosure can be implemented to realize one or more of the following potential advantages. For example, as a result of implementing a configured or defined rule for selecting spatial information for simultaneous PUCCH transmissions across different component carriers, the UE may perform directional communication with one or more cells with less ambiguity relating to which spatial relation information to use for simultaneous PUCCH transmissions. Further, some implementations may allow for the UE to select a spatial relation information associated with a PUCCH resource on a higher priority component carrier, which may provide greater directionality or beamforming of higher priority communication. Additionally, and as a result of providing for such a configured or defined rule for selecting spatial information for simultaneous PUCCH transmissions across different component carriers, the UE may experience higher data rates, greater system capacity, and greater spectral efficiency, among other examples.

Aspects of the disclosure are initially described in the context of wireless communications systems. Aspects of the disclosure are additionally illustrated by and described with reference to a communication timeline, a spatial relation information configuration, spatial relation configurations, a multi-panel communication system, and a process flow. Aspects of the disclosure are further illustrated by and described with reference to apparatus diagrams, system diagrams, and flowcharts that relate to techniques for selecting spatial relation information for simultaneous PUCCH resources across multiple component carriers.

FIG. 1 illustrates an example of a wireless communications system 100 that supports techniques for selecting spatial relation information for simultaneous PUCCH resources across multiple component carriers in accordance with examples of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

Base stations 140 may be dispersed throughout a geographic area to form the wireless communications system 100 and may be devices in different forms or having different capabilities. The base stations 140 and the UEs 115 may wirelessly communicate via one or more communication links 125. Each base station 140 may provide a geographic coverage area 110 over which the UEs 115 and the base station 140 may establish one or more communication links 125. The geographic coverage area 110 may be an example of a geographic area over which a network entity 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

The base stations 140 may communicate with the core network 130, or with one another, or both. For example, the base stations 140 may interface with the core network 130 through one or more backhaul links 120 (e.g., via an S1, N2, N3, or other interface). The base stations 140 may communicate with one another over the backhaul links 120 (e.g., via an X2, Xn, or other interface) either directly (e.g., directly between base stations 140), or indirectly (e.g., via a core network 130), or both. In some examples, the backhaul links 120 may be or include one or more wireless links.

One or more of the network entities 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link (e.g., in accordance with a midhaul interface protocol) or a fronthaul communication link (e.g., in accordance with a fronthaul interface protocol), or any combination thereof. The backhaul communication links 120, midhaul communication links, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support transmission and reception beam management for CLI measurement as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 (e.g., base stations) and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of TS=1/ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each network entity 105 or base station 140 may be distributed across various network devices (e.g., radio heads and ANCs) or consolidated into a single network device (e.g., a network entity 105 or base station 140).

The wireless communications system 100 may operate using one or more frequency bands (e.g., in the range of 300 megahertz (MHz) to 300 gigahertz (GHz)). The region from 300 MHz to 3 GHz may be referred to as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 may communicate with one or more other devices, such as one or more network entities (e.g., a network entity 105, a cell, or a TRP), via one or more directional beams. In some examples, a UE 115 may select a directional beam according to a spatial relation information configuration that the UE 115 receives from a serving network entity 105. For example, the UE 115 may receive signaling, such as via one or more MAC control elements (MAC-CEs), indicating spatial relation information associated with multiple PUCCH resources. In some aspects, the multiple PUCCH resources may span multiple component carriers such that different PUCCH resources may be located on or otherwise associated with different component carriers. For example, a first PUCCH resource may be located on a first component carrier and a second PUCCH resource may be located on a second component carrier.

In some examples, the UE 115 may receive one or more messages scheduling a first uplink transmission over the first PUCCH resource on the first component carrier and a second uplink transmission over the second PUCCH resource on the second component carrier and the first PUCCH resource may at least partially overlap in time with the second PUCCH resource. In such examples in which the first PUCCH resource at least partially overlaps in time with the second PUCCH resource, the first PUCCH resource and the second PUCCH resource may be referred to as simultaneous PUCCH resources. Similarly, the first uplink transmission and the second uplink transmission may be referred to herein as simultaneous PUCCH transmissions.

In some implementations, the UE 115 may select spatial relation information for the first uplink transmission and the second uplink transmission based on the spatial relation information configuration that the UE 115 receives from the serving network entity 105 and in accordance with a spatial relation configuration for simultaneous uplink transmissions over PUCCH resources spanning multiple component carriers. In some examples, the UE 115 may select a same spatial relation information for each uplink transmission and may transit the first uplink transmission and the second uplink transmission via a same directional beam associated with the same spatial relation information. In some other examples, the UE 115 may select different spatial relation information for each uplink transmission and may transmit the first uplink transmission via a first directional beam associated with a first spatial relation information and may transmit the second uplink transmission via a second directional beam associated with a second spatial relation information. Additional details relating to such a selection of spatial relation information for simultaneous PUCCH transmissions are described herein, including with reference to FIG. 2.

Figure 2:
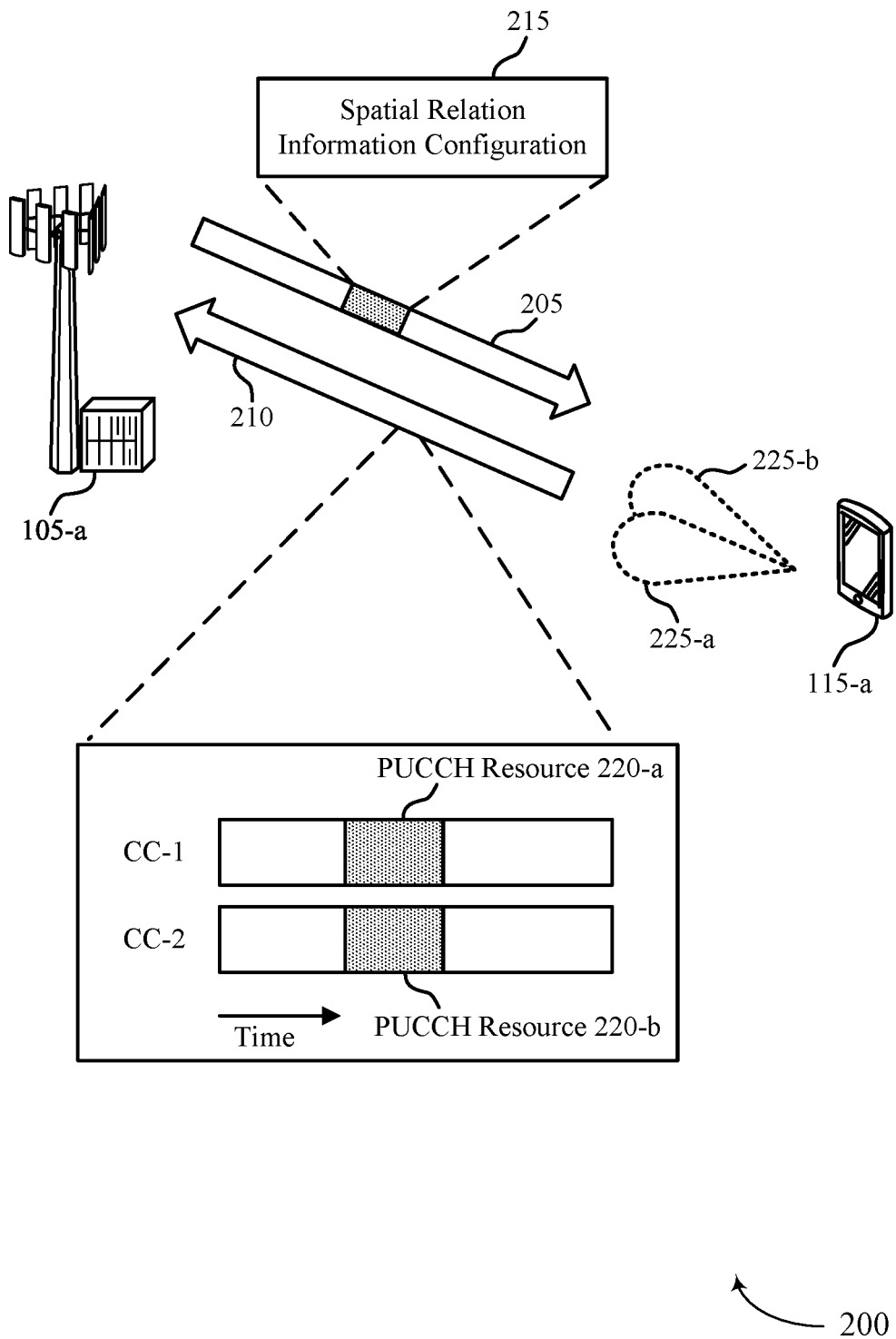

FIG. 2 illustrates an example of a wireless communications system 200 that supports techniques for selecting spatial relation information for simultaneous PUCCH resources across multiple component carriers in accordance with examples of the present disclosure. The wireless communications system 200 may implement or be implemented to realize aspects of the wireless communications system 100. For example, the wireless communications system 200 illustrates communication between a UE 115-a and a network entity 105-a, which may be examples of corresponding devices described herein, including with reference to FIG. 1. In some examples, the UE 115-a may receive a spatial relation information configuration 215 from the network entity 105-a and may transmit over simultaneous PUCCH resources 220 based on the spatial relation information configuration 215 and in accordance with a spatial relation configuration for uplink transmissions over simultaneous PUCCH resources 220 spanning multiple component carriers.

For example, the UE 115-a and the network entity 105-a may use carrier aggregation techniques and may communicate via multiple component carriers in a PUCCH group. A PUCCH group may refer to any grouping of multiple component carriers over which the UE 115-a may transmit over a PUCCH resource 220 and may include a component carrier 1 (which may be referred to as a CC-1, as shown in FIG. 2) and a component carrier 2 (which may be referred to as a CC-2, as also shown in FIG. 2). The CC-1 and the CC-2 may be examples of any component carriers for any cells. For example, the CC-1 and the CC-2 may be examples of a PCC for a PCell and a SCC for an SCell or may be examples of two different SCCs for two different SCells.

In some uplink carrier aggregation deployments, the UE 115-a may exclusively transmit over a PUCCH on a PCC within a PUCCH group. In some other uplink carrier aggregation deployments, the UE 115-*a* (and the network entity 105-*a*) may allow or otherwise support PUCCH switching among different component carriers. For example, the network entity 105-*a* may indicate which component carrier over which the UE 115-*a* is to transmit over a PUCCH resource 220 in a slot. The network entity 105-*a* may transmit such an indication to the UE 115-*a* via a new field in downlink control information (DCI) as part of a dynamic indication or via an RRC configuration as part of a semi-static indication. With such an opportunity for PUCCH switching across different component carriers, simultaneous PUCCH transmissions may be a natural scenario to support at the UE 115-*a*.

For example, the UE 115-*a* may receive a configuration of a time pattern for semi-persistently scheduled resources for acknowledgement (ACK)/negative ACK (NACK) and also may receive DCI indicating a resource for ACK/NACK for a dynamic physical downlink shared channel (PDSCH) and, in some scenarios, the DCI-indicated resource for ACK/NACK may overlap in time with a semi-persistently scheduled resource for ACK/NACK, but the two resources may be located on different component carriers. For example, the UE 115-*a* may be configured to transmit a first uplink transmission over a PUCCH resource 220-*a* on the CC-1 according to a semi-persistent scheduling (SPS) configuration and may receive DCI indicating that the UE 115-*a* is to transmit a second uplink transmission over a PUCCH resource 220-*b* on the CC-2 and the PUCCH resource 220-*a* and the PUCCH resource 220-*b* may at least partially overlap in time. Additional details relating to such simultaneous PUCCH transmissions on different component carriers are described herein, including with reference to FIG. 3.

In some examples, the UE 115-*a* may receive the spatial relation information configuration 215 from the network entity 105-*a* via a communication link 205 (e.g., a downlink) and the spatial relation information configuration 215 may indicate spatial relation information associated with PUCCH resources 220 over which the UE 115-*a* may transmit. For example, the spatial relation information configuration 215 may indicate spatial relation information for each PUCCH resource 220 over which the UE 115-*a* may transmit. In some examples, the spatial relation information configuration 215 may indicate a first spatial relation information for the PUCCH resource 220-*a* and may indicate a second spatial relation information for the PUCCH resource 220-*b*. Additional details relating to such a spatial relation information configuration 215 that indicates spatial relation information for each PUCCH resource 220 are described herein, including with reference to FIG. 4. Further, additional details relating to the signaling of the spatial relation information configuration 215 are also described herein, including with reference to FIG. 8.

In such examples in which the spatial relation information configuration 215 indicates the first spatial relation information for the PUCCH resource 220-*a* and the second spatial relation information for the PUCCH resource 220-*b* and in which the UE 115-*a* is scheduled for simultaneous PUCCH transmissions over the PUCCH resource 220-*a* and the PUCCH resource 220-*b*, the UE 115-*a* may lack a configured or defined rule for how to select which spatial relation to use for the two simultaneous PUCCH transmissions. For example, as a result of the PUCCH resource 220-*a* and the PUCCH resource 220-*b* being associated or configured with different spatial relation information, ambiguity may arise between the UE 115-*a* and the network entity 105-*a* if the UE 115-*a* selects spatial relation information for the simultaneous PUCCH transmissions without a configured rule. Further, such ambiguity between the UE 115-*a* and the network entity 105-*a* may potentially result in the UE 115-*a* using a different spatial relation information than the network entity 105-*a* expects the UE 115-*a* to use, which may result in communication failures if the network entity 105-*a* monitors for the uplink transmissions in a different direction than the direction in which the UE 115-*a* performs the uplink transmissions.

In some implementations, the UE 115-*a* and the network entity 105-*a* may employ or otherwise operate in accordance with a spatial relation configuration according to which the UE 115-*a* may select spatial relation information for simultaneous PUCCH transmissions over the PUCCH resources 220 spanning multiple component carriers. In some examples, the spatial relation configuration may define how the UE 115-*a* selects a same spatial relation information for both the first uplink transmission over the PUCCH resource 220-*a* and for the second uplink transmission over the PUCCH resource 220-*b*. Such a restriction of a same spatial relation information for simultaneous PUCCH transmissions may simplify or reduce an impact on a specification or may simplify UE implementation, or both. In some other examples, the spatial relation information may define how the UE 115-*a* selects different spatial relation information for the first uplink transmission over the PUCCH resource 220-*a* and for the second uplink transmission over the PUCCH resource 220-*b*. Such a configuration that supports selecting different spatial relation information for the two simultaneous PUCCH transmissions may allow or support more (e.g., maximum) flexibility and may enable each PUCCH transmission to follow its own configured spatial relation information.

The UE 115-*a* may feature a capability for supporting a same spatial relation information for simultaneous PUCCH transmissions on different component carriers or for supporting different spatial relation information for simultaneous PUCCH transmissions on different component carriers, or for supporting both. In some examples, the capability of the UE may vary for different frequency band allocation scenarios. For example, for component carriers in a same band (e.g., for intra-band carrier aggregation), the UE 115-*a* may support (e.g., exclusively support) a same spatial relation information for simultaneous PUCCH transmissions. As such, if the CC-1 and the CC-2 are in-band of each other, the UE 115-*a* may select a same spatial relation information for the simultaneous PUCCH transmissions. For component carriers in different bands (e.g., for inter-band carrier aggregation), the UE 115-*a* may support a same spatial relation information for simultaneous PUCCH transmissions or may support different spatial relation information for simultaneous PUCCH transmissions. For such component carriers that are located in different frequency bands, the UE 115-*a* may feature a capability for same or different spatial relation information for simultaneous PUCCH transmissions on a per band-band combination basis and, accordingly, may report the capability per band-band combination.

The UE 115-*a* may transmit UE capability signaling to the network entity 105-*a* indicating the capability of the UE 115-*a*. In examples in which the capability of the UE 115-*a* is on a per band-band combination basis, the UE 115-*a* may transmit the UE capability signaling to the network entity 105-*a* indicating the capability of the UE 115-*a* for different pairs of frequency bands. As such, in an example, the UE 115-*a* may indicate, via the UE capability signaling, that the UE 115-*a* supports different spatial relation information for simultaneous PUCCH transmissions for a first set of band-band combinations or pairs and that the UE 115-*a* supports same spatial relation information (and not different spatial relation information) for simultaneous PUCCH transmissions for a second set of band-band combinations or pairs. For example, if the UE 115-*a* employs inter-band carrier aggregation across a frequency band A, a frequency band B, a frequency band C, a frequency band D, a frequency band E, and a frequency band F, the UE 115-*a* may report a capability for different spatial relation information for simultaneous PUCCH transmissions for a (band A, band D) pair, a (band A, band E) pair, a (band A, band F) pair, a (band B, band D) pair, and a (band B, band E) pair and may report a capability for same spatial relation information for simultaneous PUCCH transmissions for a (band A, band B) pair, a (band A, band C) pair, a (band D, band E) pair, and a (band D, band F) pair.

In some examples, the network entity 105-*a* may configure the spatial relation configuration in accordance with the UE capability signaling and may signal the configuration to the UE 115-*a*. In some examples, for instance, whether the UE 115-*a* is to operate using same spatial relation information for simultaneous PUCCH transmissions (for at least some band-band combinations) or is to operate using different spatial relation information for simultaneous PUCCH transmissions (for at least some band-band combinations), or both, may be configured by the network entity 105-*a* via RRC signaling.

In some examples (e.g., in which the spatial relation configuration defines how the UE 115-*a* selects same spatial relation information for both the first uplink transmission and the second uplink transmission), the spatial relation configuration may define that PUCCH resources 220 that overlap in time and that are located on or otherwise associated with different component carriers are configured with same spatial relation information. For example, in accordance with the spatial relation configuration, the network entity 105-*a* may construct the spatial relation information configuration 215 such that PUCCH resources 220 that overlap in time and that are located on different component carriers (e.g., such as the PUCCH resource 220-*a* and the PUCCH resource 220-*b*) are configured with same spatial relation information. In other words, the network entity 105-*a* may configure the PUCCH resource 220-*a* and the PUCCH resource 220-*b* with same spatial relation information as a result of the PUCCH resource 220-*a* and the PUCCH resource 220-*b* overlapping in time and being located on different component carriers.

In such examples in which the network entity 105-*a* configures PUCCH resources 220 that overlap in time and that are located on different component carriers with same spatial relation information, the UE 115-*a* and the network entity 105-*a* may use the MAC-CE signaling of the spatial relation information configuration 215 to enforce the same spatial relation information for PUCCH resources 220 across different component carriers. As such, the spatial relation configuration may disable a switch among different spatial relations while switching across component carriers. Such a disabling of a switch among different spatial relations while switching across component carriers is further illustrated by and described with reference to FIG. 5.

In some other examples in which the spatial relation configuration defines how the UE 115-*a* selects same spatial relation information for both the first uplink transmission and the second uplink transmission, the spatial relation configuration may allow for different spatial relation information to be configured for overlapping PUCCH resources 220 that are located on different component carriers and may define a priority for each component carrier such that the UE 115-*a* selects a spatial relation information to use for simultaneous PUCCH transmissions based on the priority. For example, if the spatial relation information configuration indicates the first spatial relation information for the PUCCH resource 220-*a* that is located on the CC-1 and the second spatial relation information for the PUCCH resource 220-*b* that is located on the CC-2 and if the CC-1 is associated with a relatively higher priority (e.g., in accordance with the spatial relation configuration), the UE 115-*a* may select to use the first spatial relation information for both the first uplink transmission over the PUCCH resource 220-*a* and the second uplink transmission over the PUCCH resource 220-*b*. Such an allowance for different spatial relations for overlapping PUCCH resources 220 on different component carriers is also further illustrated by and described with reference to FIG. 5.

In other words, in the case of simultaneous PUCCH transmission on two or more component carriers, the spatial relation information that the UE 115-*a* uses follows a component carrier with a relatively higher priority. In some examples, the priority may be pre-defined or pre-configured (e.g., such as in a specification) and may prioritize component carriers following component carrier indexing. For example, the UE 115-*a* and the network entity 105-*a* may prioritize component carriers such that a PCC is associated with a relatively higher priority than an SCC-1 and the SCC-1 is associated with a relatively higher priority than an SCC-2 (e.g., PCC>SCC-1>SCC-2). In some examples, the prioritization rule may be independent for different component carrier groups or bands. For example, the UE 115-*a* and the network entity 105-*a* may apply the prioritization for component carriers on bands (A, B, C) separately than for component carriers on bands (D, E, F) rather than applying the prioritization rule across the board for bands (A, B, C, D, E, F). The UE 115-*a* or the network entity 105-*a* may configure or otherwise determine such component carrier groups or bands based on a UE capability on component carriers or bands that share a same uplink beam.

In such examples in which the spatial relation configuration allows for different spatial relation information to be configured for overlapping PUCCH resources that are located on different component carriers, the network entity 105-*a* may use the MAC-CE signaling of the spatial relation information configuration 215 to set spatial relation information for PUCCH resources 220 on a per component carrier basis, which may allow for different spatial relation information for PUCCH resources 220 across different component carriers. Further, in such examples in which the spatial relation configuration indicates the priority of the component carriers, in the case of PUCCH carrier switch without simultaneous PUCCH transmission, the UE 115-*a* may follow the spatial relation information provided by the spatial relation information configuration 215 on the component carrier over which the PUCCH is transmitted.

In some other examples in which the spatial relation configuration defines how the UE 115-*a* selects same spatial relation information for both the first uplink transmission and the second uplink transmission, the spatial relation configuration may allow for different spatial relation information to be configured for overlapping PUCCH resources 220 that are located on different component carriers and the network entity 105-*a* may configure a time pattern to signal a "fallback" spatial relation information. For example, the network entity 105-*a* may configure such a fallback spatial relation information for each slot in case a spatial relation collision occurs with simultaneous PUCCH transmissions across component carriers (e.g., in case of a simultaneous PUCCH transmission over PUCCH resources 220 associated with different spatial relation information on different component carriers). The network entity 105-*a* may, for example, configure the fallback spatial relation information pattern as time pattern=[spatialRelationInfo 1, spatialRelationInfo 3, spatialRelationInfo 2, spatialRelationInfo 8] for slots 4m+1, 4m+2, 4m+3, and 4m+4, respectively. As such, the fallback spatial relation information may be spatialRelationInfo 1 for slot 4m+1, spatialRelationInfo 3 for slot 4m+2, and so on.

In such examples in which the spatial relation configuration indicates the time pattern for the fallback spatial relation information, in the case of PUCCH carrier switch without simultaneous PUCCH transmission, the UE 115-*a* may follow the spatial relation information provided by the spatial relation information configuration 215 on the component carrier over which the PUCCH is transmitted. Alternatively or additionally, in examples in which the spatial relation configuration indicates the time pattern for the fallback spatial relation information, in the case of simultaneous PUCCH transmissions on two or more component carriers and if the simultaneous PUCCH transmissions are associated with different spatial relation information, the UE 115-*a* may use the fallback spatial relation information relation for the simultaneous PUCCH transmissions (e.g., for all of the simultaneous PUCCH transmissions). In some examples, the network entity 105-*a* may configure the fallback spatial relation information or the time pattern for the fallback spatial relation configuration at the UE 115-*a* via control signaling, such as via RRC signaling.

In some examples (e.g., in which the spatial relation configuration defines how the UE 115-*a* selects different spatial relation information for the first uplink transmission and the second uplink transmission), the spatial relation configuration may define how the network entity 105-*a* schedules uplink transmissions over overlapping PUCCH resources 220 from different UE panels. For example, one UE panel may be capable of following one spatial relation at a time (e.g., and not more than one) and the UE 115-*a* may use different spatial relation information for simultaneous PUCCH transmissions from different antenna panels. In some implementations, the UE 115-*a* may transmit signaling to the network entity 105-*a* that indicates a mapping between spatial relations that are configured at the UE 115-*a* and panel ID and the network entity 105-*a* may use the mapping to ensure that overlapped PUCCH resources 220 are transmitted from different UE panels. Additional details relating to such examples in which different spatial relation information is used for the two simultaneous PUCCH transmissions from different UE panels are described herein, including in the context of multi-TRP communication with reference to FIG. 6.

As such, the UE 115-*a* may select spatial relation information for the first uplink transmission over the PUCCH resource 220-*a* on the CC-1 and for the second uplink transmission over the PUCCH resource 220-*b* on the CC-2 and the selected spatial relation information may be the same or different for the two uplink transmissions. The UE 115-*a* may select a directional beam 225 to use for transmitting the first uplink transmission and the second uplink transmission based on the spatial relation information that the UE 115-*a* selects for the two uplink transmissions. In examples in which the UE 115-*a* selects same spatial relation information for both the first uplink transmission and the second uplink transmission, the UE 115-*a* may transmit the first uplink transmission and the second uplink transmission via a same directional beam 225 (e.g., such as one of a directional beam 225-*a* or a directional beam 225-*b*). Such a same directional beam 225 may be associated with the same spatial relation information that is configured for both the PUCCH resource 220-*a* and the PUCCH resource 220-*b* (e.g., if overlapping PUCCH resources 220 are configured with same spatial relation information by definition), the spatial relation information associated with which of the PUCCH resource 220-*a* or the PUCCH resource 220-*b* is located on a relatively higher priority component carrier, or the fallback spatial relation information configured for the slot during which the uplink transmissions overlap.

Alternatively or additionally, in examples in which the UE 115-*a* selects different spatial relation information for each uplink transmission, the UE 115-*a* may transmit the first uplink transmission via the directional beam 225-*a* (e.g., which may be associated with a first spatial relation information configured for the PUCCH resource 220-*a*) and may transmit the second uplink transmission via the directional beam 225-*b* (e.g., which may be associated with a second spatial relation information configured for the PUCCH resource 220-*b*). Accordingly, the UE 115-*a* may transmit the simultaneous PUCCH transmissions to the network entity 105-*a* via a communication link 210 (e.g., an uplink).

Further, although described in the context of communication between the UE 115-*a* and the network entity 105-*a*, the UE 115-*a* may employ similar operations and may transmit one or both of the simultaneous PUCCH transmissions to one or more TRPs, one or more cells, or one or more other network entities 105. Some implementations are further described in the context of multi-TRP communication with reference to FIG. 6.

Figure 3:
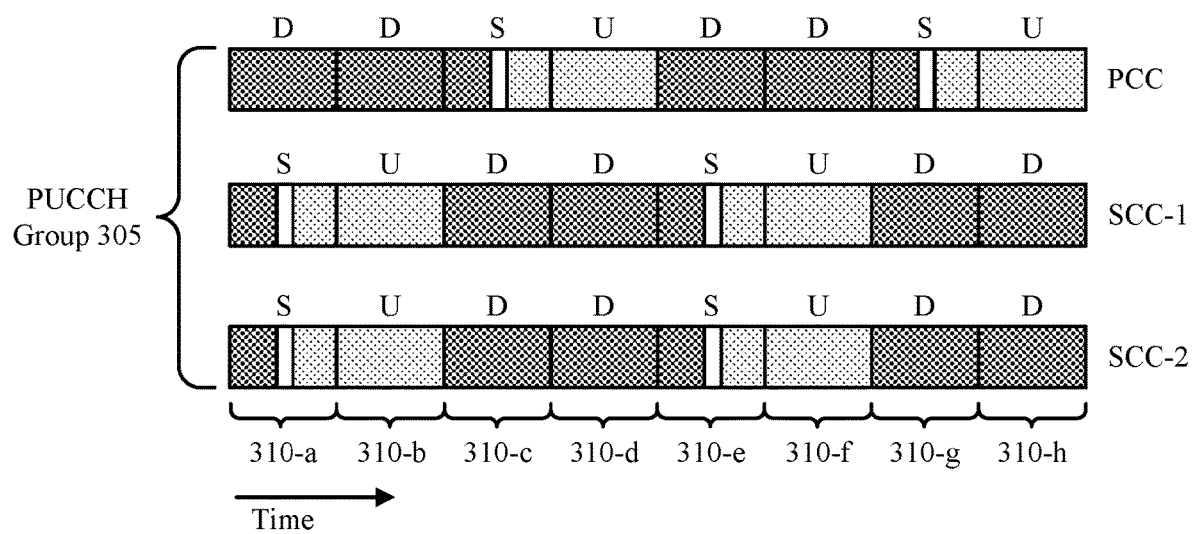
FIG. 3 illustrates an example of a communication timeline that supports techniques for selecting spatial relation information for simultaneous PUCCH resources across multiple component carriers in accordance with examples of the present disclosure.

FIG. 3 illustrates an example of a communication timeline 300 that supports techniques for selecting spatial relation information for simultaneous PUCCH resources across multiple component carriers in accordance with examples of the present disclosure. The communication timeline may implement or be implemented to realize aspects of the wireless communications system 100 or the wireless communications system 200. For example, a UE 115 and a network entity 105 (which may be examples of corresponding devices described herein, including with reference to FIGS. 1 and 2) may communicate in accordance with the communication timeline 300. In some examples, the UE 115 may select spatial relation information for uplink transmissions that are scheduled for overlapping PUCCH resources on different component carriers within a PUCCH group 305 in accordance with a spatial relation configuration that defines a spatial relation selection rule for transmissions over simultaneous PUCCH resources across multiple component carriers.

The PUCCH group 305 may include a PCC for communication on a PCell, an SCC-1 for communication on a first SCell, and an SCC-2 for communication on a second SCell and the UE 115 may transmit over PUCCH resources on any one or more of the PCC, the SCC-1, and the SCC-2. Further, the communication timeline 300 may include a number of slots 310 and each component carrier may feature a TDD mode according to which uplink and downlink resources are allocated over time on each component carrier. In some examples, and as shown in FIG. 3, the PCC may feature a first TDD pattern and the SCC-1 and the SCC-2 may both feature a same second TDD pattern.

As a result of the SCC-1 and the SCC-2 having some overlapping uplink resources (e.g., according to their common TDD pattern), the UE 115 may receive scheduling information for uplink transmissions over overlapping PUCCH resources that are located on different component carriers. For example, the UE 115 may receive one or more messages scheduling a first uplink transmission over a first PUCCH resource on the SCC-1 and scheduling a second uplink transmission over a second PUCCH resource on the SCC-2 and, in some scenarios, the first PUCCH resource and the second PUCCH resource may at least partially overlap in time. In some examples, for instance, the UE 115 may support SPS communication and may receive a message scheduling SPS ACK/NACK following a time pattern such that the UE 115 may transmit the SPS ACK/NACK over a PUCCH resource on a specified component carrier during a given slot. As shown in FIG. 3, the time pattern may indicate that the UE 115 is to transmit SPS ACK/NACK on the SCC-1 during a slot 310-*a*, on the SCC-2 during a slot 310-*b*, on the PCC during a slot 310-*c*, on the PCC during a slot 310-*d*, on the SCC-1 during a slot 310-*e*, on the SCC-2 during a slot 310-*f*, on the PCC during a slot 310-*g*, and on the PCC during a slot 310-*h*.

As such, if the UE 115 receives DCI indicating a PUCCH resource over which the UE 115 is to transmit ACK/NACK for a dynamic PDSCH on the SCC-1 during the slot 310-*b* or the slot 310-*f*, the UE 115 may be scheduled for simultaneous PUCCH transmissions on different component carriers. In some implementations, the UE 115 and the network entity 105 may operate in accordance with the spatial relation configuration that defines a spatial relation selection rule for transmissions over simultaneous PUCCH resources across multiple component carriers to select spatial relation information for the two simultaneous PUCCH transmissions. Additional details relating to such a spatial relation configuration that defines a spatial relation selection rule are described herein, including with reference to FIG. 2.

Figure 4:
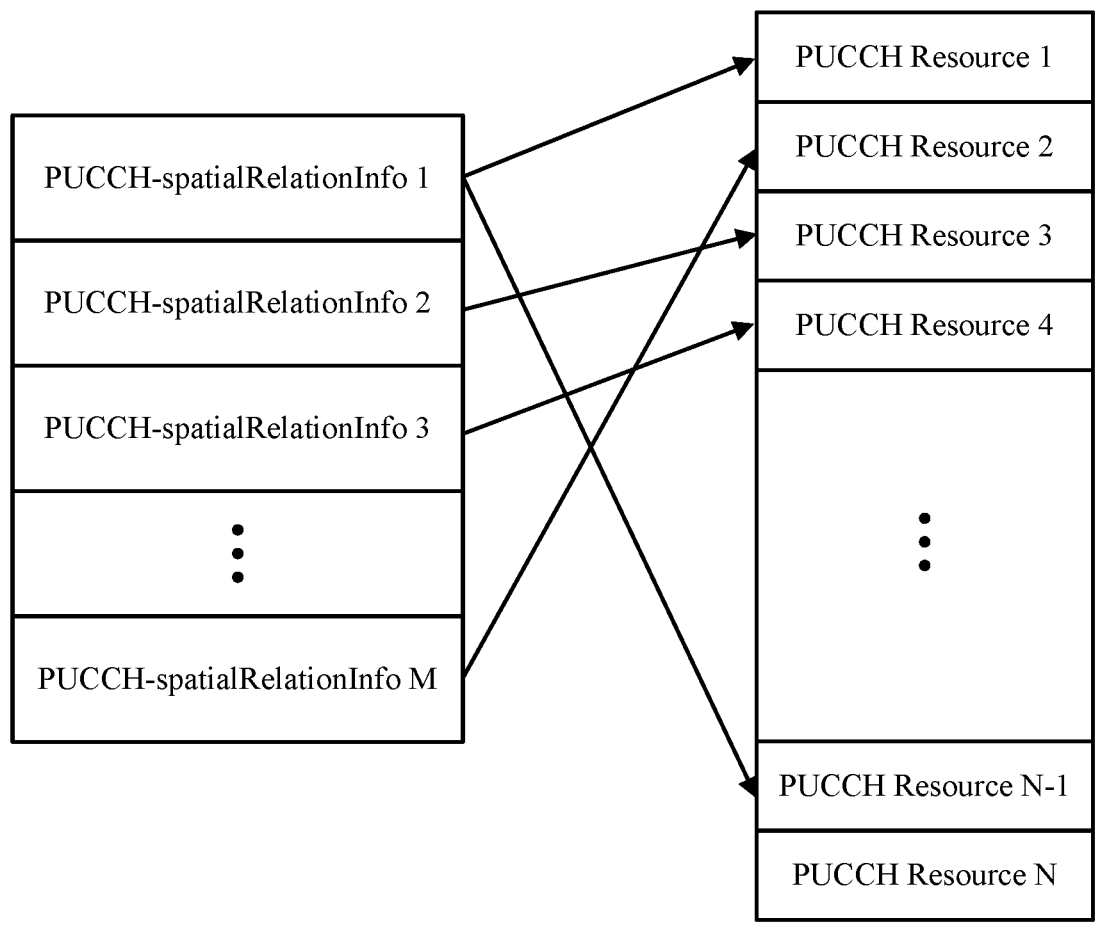
FIGS. 4 and 5 illustrate examples of spatial relation information configurations that support techniques for selecting spatial relation information for simultaneous PUCCH resources across multiple component carriers in accordance with examples of the present disclosure.

FIG. 4 illustrates an example of a spatial relation information configuration 400 that supports techniques for selecting spatial relation information for simultaneous PUCCH resources across multiple component carriers in accordance with examples of the present disclosure. The spatial relation information configuration 400 may implement or be implemented to realize aspects of the wireless communications system 100 or the wireless communications system 200. For example, a network entity 105 may provide a UE 115 (which may be examples of corresponding devices described herein, including with reference to FIGS. 1 and 2) with the spatial relation information configuration 400 and the spatial relation information configuration 400 may indicate spatial relation information for each PUCCH resource of a set of N configured PUCCH resources. In some examples, the UE 115 and the network entity 105 may use the spatial relation information configuration 400 in addition with the spatial relation configuration that defines a spatial relation selection rule to select spatial relation information for simultaneous PUCCH transmissions on multiple component carriers.

Spatial relation information for a PUCCH resource may be equivalently referred to as or configured by a PUCCH-spatialRelationInfo field and the network entity 105 may configure PUCCH-spatialRelationInfo per uplink BWP. In some systems, the network entity 105 may configure PUCCH-spatialRelationInfo per uplink BWP exclusively for the PCC. In some other systems, the network entity 105 may configure PUCCH-spatialRelationInfo per uplink BWP for the PCC and for one or more SCCs. The network entity 105 may configure up to M PUCCH-spatialRelationInfo per uplink BWP. In some examples, for instance, the network entity 105 may configure up to 8 PUCCH-spatialRelationInfo per uplink BWP (e.g., such that M=8). In some other examples, the network entity 105 may configure up to 64 PUCCH-spatialRelationInfo per uplink BWP (e.g., such that M=64). A PUCCH-spatialRelationInfo information element may include a number of parameters, including a PUCCH-spatialRelationInfoId parameter, a servingCellId parameter, a referenceSignal parameter including an ssb-Index parameter, a csi-RS-Index parameter, and an srs parameter, a pucchPathlossReferenceRS-Id parameter, a p0-PUCCH-Id parameter, and a closedLoopIndex parameter.

The network entity 105 may transmit the spatial relation information configuration 400 to the UE 115 via one or more MAC-CEs and the one or more MAC-CEs may pick or indicate one PUCCH-spatialRelationInfo for each PUCCH resource. In other words, one PUCCH-spatialRelationInfo may map to multiple PUCCH resources, while one PUCCH resource may have one (e.g., only one) PUCCH-spatialRelationInfo. For example, and as shown in FIG. 4, a PUCCH-spatialRelationInfo 1 may map to a PUCCH resource 1 and a PUCCH resource N−1, a PUCCH-spatialRelationInfo 2 may map to a PUCCH resource 3, PUCCH-spatialRelationInfo 3 may map to a PUCCH resource 4, and a PUCCH-spatialRelationInfo M may map to a PUCCH resource 2. In some examples, one MAC-CE may set or indicate PUCCH-spatialRelationInfo for each PUCCH resource separately. Additionally or alternatively, one MAC-CE may set or indicate PUCCH-spatialRelationInfo for a group of PUCCH resources. Additional details relating to such separate or grouped MAC-CEs are described herein, including with reference to FIG. 8.

Figure 5:
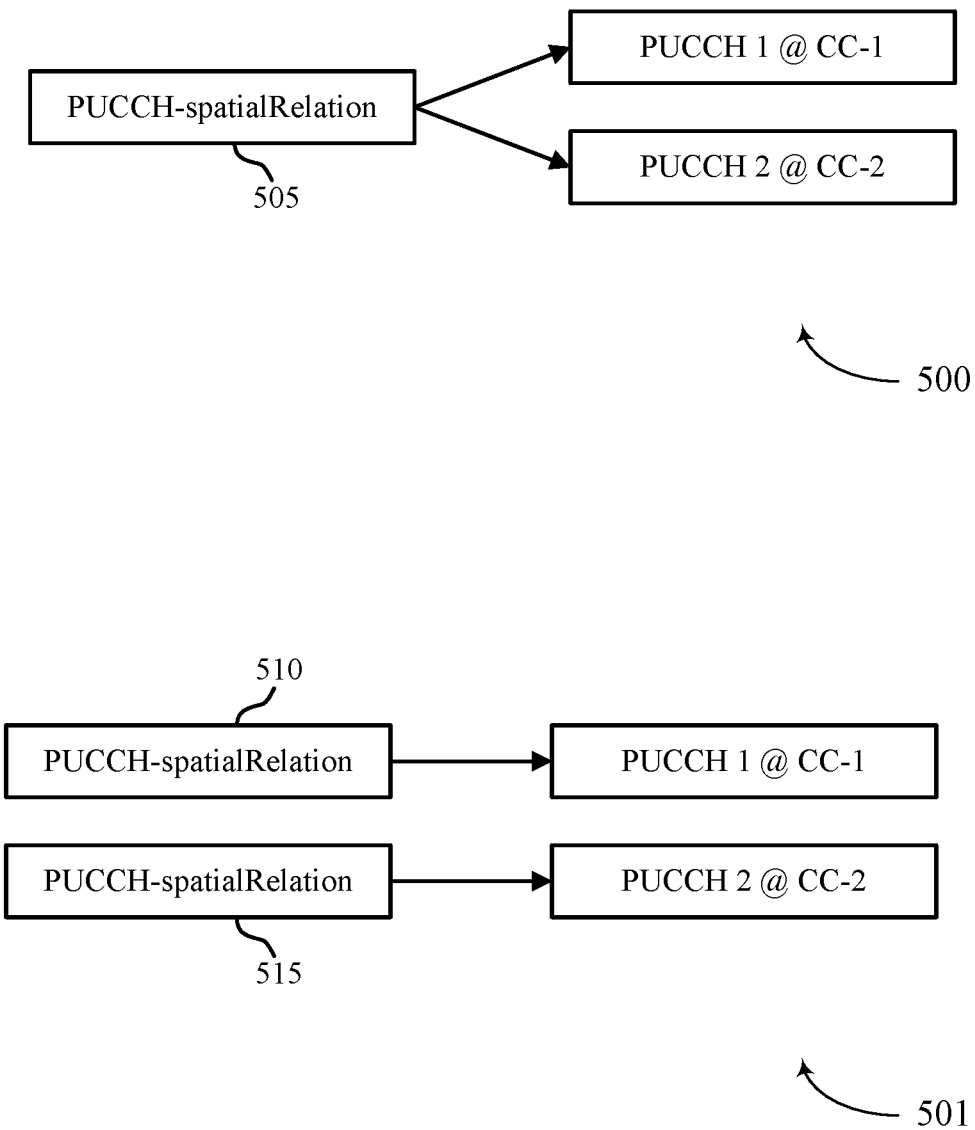

FIG. 5 illustrates examples of spatial relation information configurations 500 and 501 that support techniques for selecting spatial relation information for simultaneous PUCCH resources across multiple component carriers in accordance with examples of the present disclosure. The spatial relation information configurations 500 and 501 may implement or be implemented to realize aspects of the wireless communications system 100 or the wireless communications system 200. For example, a UE 115 and a network entity 105 (which may be examples of corresponding devices described herein, including with reference to FIGS. 1 and 2) may select spatial relation information for simultaneous PUCCH transmissions on multiple component carriers in accordance with the spatial relation information configuration 500 or the spatial relation information configuration 501.

In some implementations, for example, the spatial relation information configuration 500 may define that PUCCH resources that overlap in time and that are associated with (e.g., located on) different component carriers are configured with same spatial relation information. As such, in accordance with the spatial relation information configuration 500, the network entity 105 may configure spatial relation information for the PUCCH resources that are configured at the UE 115 such that any PUCCH resources that overlap in time and are located on different component carriers are configured with same spatial relation information. As shown in FIG. 5, the network entity 105 may configure a PUCCH-spatialRelation 505 for both a PUCCH resource 1 on a first component carrier (e.g., a CC-1) and a PUCCH resource 2 on a second component carrier (e.g., a CC-2) in accordance with the spatial relation information configuration 500 and as a result of the PUCCH resource 1 and the PUCCH resource 2 overlapping in time and being located on different component carriers.

In some implementations, the spatial relation information configuration 501 may allow for PUCCH resources that overlap in time and that are associated with (e.g., located on) different component carriers to be configured with different spatial relation information. As such, in accordance with the spatial relation information configuration 501, the network entity 105 may configure different spatial relation information for each PUCCH resource regardless of whether that PUCCH resource overlaps with another PUCCH resource on a different component carrier. As shown in FIG. 5, the network entity 105 may configure a PUCCH-spatialRelation 510 for the PUCCH resource 1 on the first component carrier (e.g., the CC-1) and may configure a PUCCH-spatialRelation 515 for the PUCCH resource 2 on the second component carrier (e.g., the CC-2) even though the PUCCH resource 1 and the PUCCH resource 2 overlap in time and are located on different component carriers.

In some examples, if the UE 115 is scheduled for uplink transmissions over the PUCCH resource 1 and the PUCCH resource 2, the UE 115 may select to use one of the PUCCH-spatialRelation 510 or the PUCCH-spatialRelation 515, a separately configured fallback PUCCH-spatialRelation, or both the PUCCH-spatialRelation 510 and the PUCCH-spatialRelation 515. In examples in which the UE 115 selects to use both the PUCCH-spatialRelation 510 and the PUCCH-spatialRelation 515 for the two uplink transmissions over the simultaneous PUCCH resources, the UE 115 and the network entity 105 may operate in accordance with a rule that defines how the network entity schedules simultaneous PUCCH transmissions such that the associated spatialRelationInfo map to different antenna panels of the UE 115, as described in more detail with reference to FIG. 6.

Figure 6:
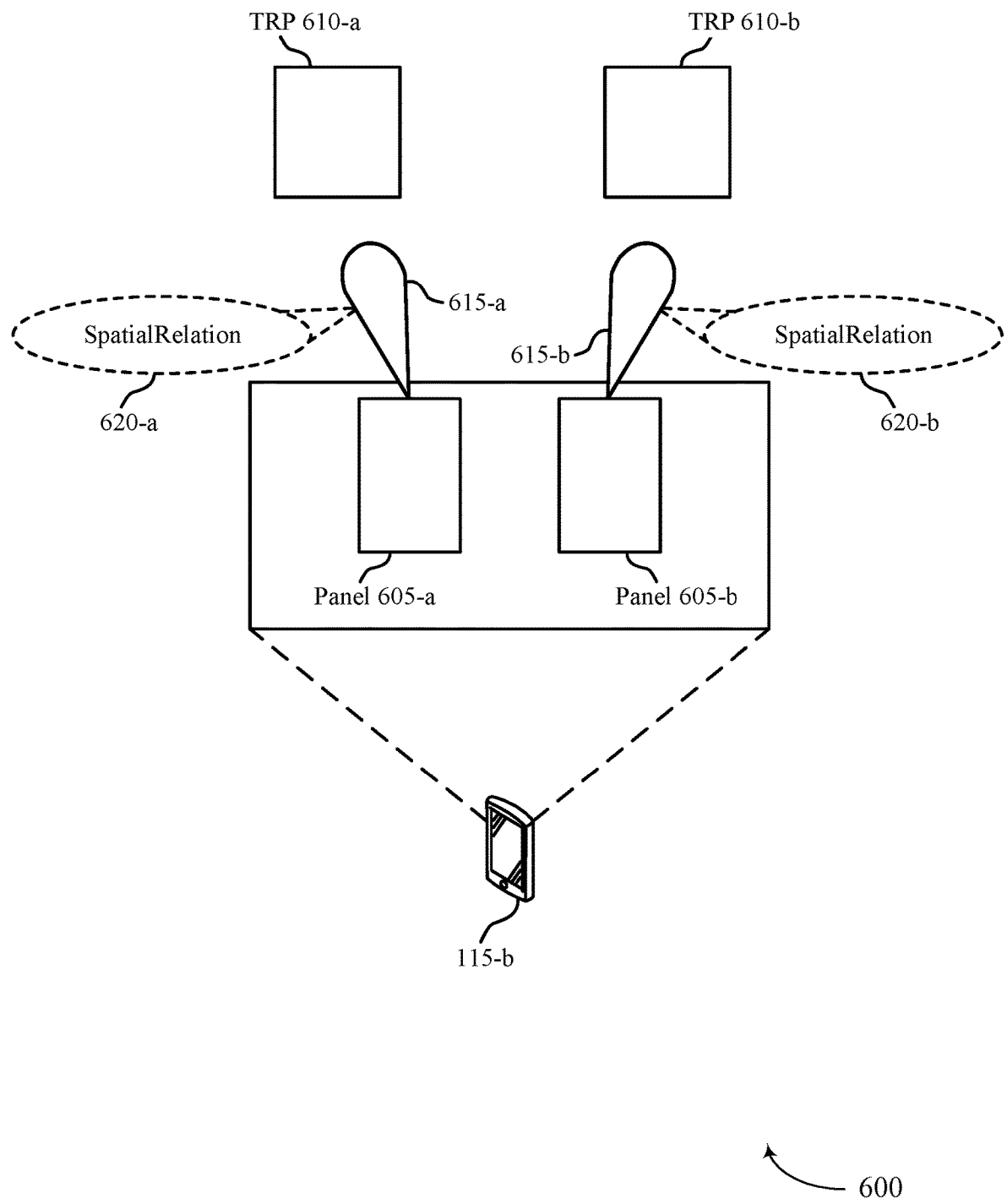
FIG. 6 illustrates an example of a multi-panel communication system that supports techniques for selecting spatial relation information for simultaneous PUCCH resources across multiple component carriers in accordance with examples of the present disclosure.

FIG. 6 illustrates an example of a multi-panel communication system 600 that supports techniques for selecting spatial relation information for simultaneous PUCCH resources across multiple component carriers in accordance with examples of the present disclosure. The multi-panel communication system 600 may implement or be implemented to realize aspects of the wireless communications system 100 or the wireless communications system 200. For example, a UE 115-b may communicate with one or more TRPs 610 (which may be associated with or scheduled by a serving network entity 105) via one or more directional beams 615 in accordance with a spatial relation configuration for simultaneous uplink transmissions over PUCCH resources across multiple component carriers. The UE 115-b and the TRPs 610 may be examples of corresponding devices described herein, including with reference to FIGS. 1 and 2.

In some implementations, the UE 115-b may use different PUCCH-spatialRelationInfo for simultaneous PUCCH transmissions and, in some of such implementations, the UE 115-b may use the different PUCCH-spatialRelationInfo for simultaneous PUCCH transmissions as part of a multi-panel or multi-TRP scenario in which the UE 115-b is equipped with multiple panels 605 from which the UE 115-b is able to transmit to multiple TRPs 610 simultaneously. For example, the UE 115-b may operate a panel 605-a from which the UE 115-b may transmit to a TRP 610-a and may operate a panel 605-b from which the UE 115-b may transmit to a TRP 610-b and, in some examples, the UE 115-b may use a spatialRelation 620-a for a first of two simultaneous PUCCH transmissions that the UE 115-b sends from the panel 605-a and may use a spatialRelation 620-b for a second of the two simultaneous PUCCH transmissions that the UE 115-b sends from the panel 605-b. In such examples, the UE 115-b may transmit the first PUCCH transmission via a directional beam 615-a that is associated with the spatialRelation 620-a and may transmit the second PUCCH transmission via a directional beam 615-b that is associated with the spatialRelation 620-b.

To support the use of different PUCCH-spatialRelationInfo for simultaneous PUCCH transmissions, the network entity 105 may schedule uplink transmissions over overlapping PUCCH resources such that the overlapping PUCCH resources are configured with spatial relation information that map to different panels 605 of the UE 115-b (and, likewise, to different TRPs 610). The UE 115-b may report a mapping between spatialRelation and panel ID to enable the network entity 105 to make such scheduling decisions. In some examples, the UE 115-b may report the mapping in beam-related feedback. The mapping may indicate which spatialRelationInfo maps to which panel 605 of the UE 115-b. For example, if the UE 115-b receives a configuration of spatialRelation 1/2/3/4/5/6, the UE 115-b may report to the network entity 105 that spatialRelation 1/2/3 maps to the panel 605-a and that spatialRelation 4/5/6 maps to the panel 605-b. As such, the network entity 105 may make sure that different spatialRelations that are used for simultaneous PUCCH transmissions avoid mapping to a same panel 605 of the UE 115-b. For example, the network entity 105 may schedule the uplink transmissions from the UE 115-b such that the spatialRelation 620-a corresponds to a spatialRelation 1 and the spatialRelation 620-b corresponds to a spatialRelation 4 (and such that the network entity 105 avoids scenarios in which the spatialRelation 620-a corresponds to a spatialRelation 1 and the spatialRelation 620-b corresponds to a spatialRelation 2).

Further, in implementations in which the UE 115-b operates the panel 605-a and the panel 605-b for multi-TRP communication, the UE 115-b may follow a different rule for selecting spatial relation information for simultaneous PUCCH transmissions that are associated with a same TRP ID or a same panel ID. For example, the UE 115-b may employ a spatial relation prioritization rule according to which the UE 115-b may prioritize a PUCCH spatial relation on a relatively higher (or highest) priority component carrier among component carriers with overlapped PUCCHs associated with the same TRP ID. In some examples, the UE 115-b may receive an indication of which TRP ID is associated with which PUCCH transmissions via signaling from the network entity 105. For example, the associated TRP ID may be CORESETPoolIndex and the network entity 105 may signal an indication of the CORESETPoolIndex via RRC signaling, DCI, a MAC-CE, or any combination thereof if configuring, scheduling, or activating the PUCCH resource. Alternatively or additionally, the UE 115-b may use a fallback spatial relation information for simultaneous PUCCH transmissions that are associated with a same TRP ID without exceeding the scope of the present disclosure.

Figure 7:
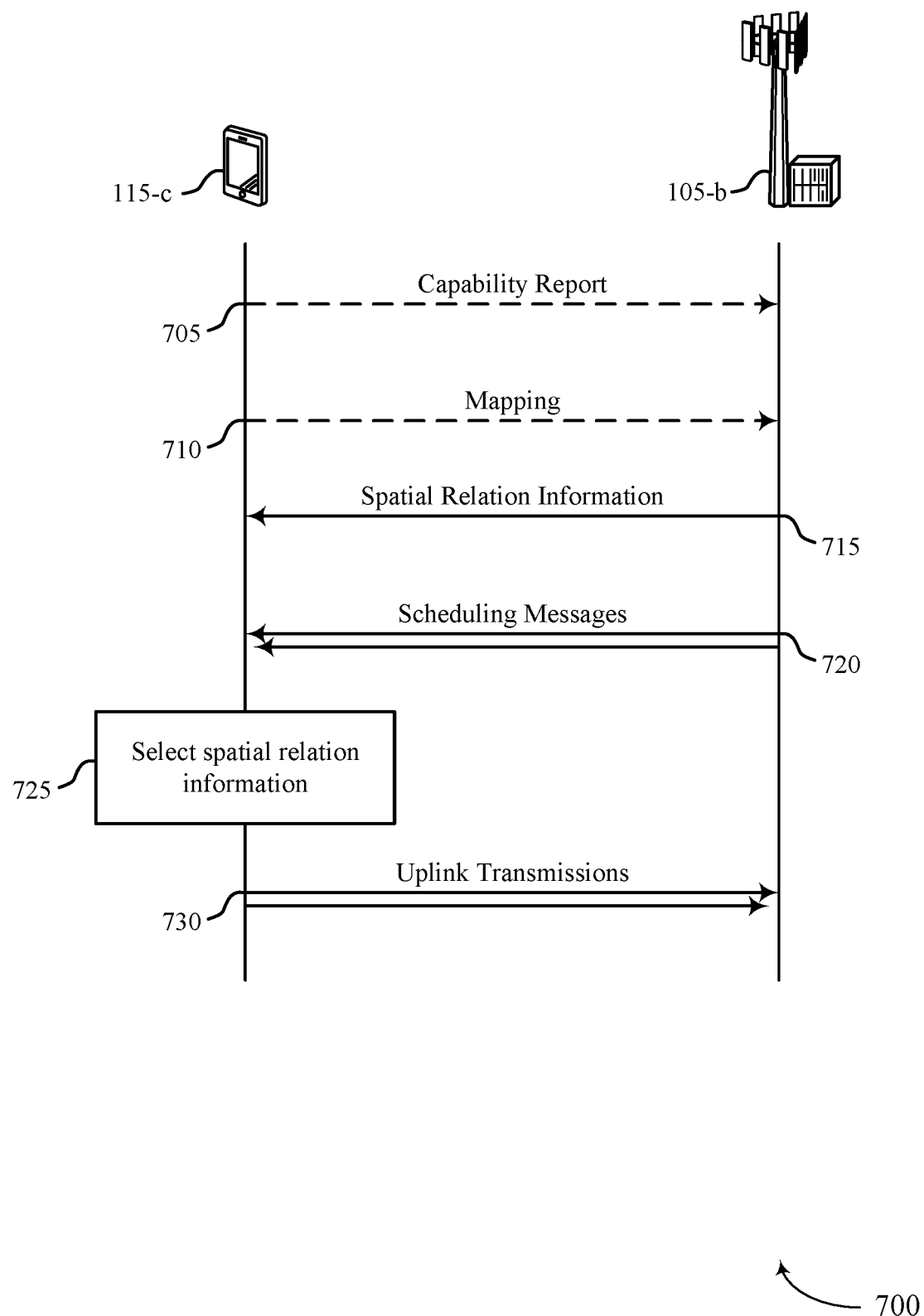
FIG. 7 illustrates an example of a process flow that supports techniques for selecting spatial relation information for simultaneous PUCCH resources across multiple component carriers in accordance with examples of the present disclosure.

FIG. 7 illustrates an example of a process flow 700 that supports techniques for selecting spatial relation information for simultaneous PUCCH resources across multiple component carriers in accordance with examples of the present disclosure. The process flow 700 may implement or be implemented to realize aspects of the wireless communications system 100 or the wireless communications system 200. For example, the process flow 700 illustrates communication between a UE 115-c and a network entity 105-b, which may be examples of corresponding devices described herein, including with reference to FIGS. 1 and 2. In some examples, the UE 115-c and the network entity 105-b may operate in accordance with a spatial relation configuration that defines a spatial relation information selection rule according to which the UE 115-c selects spatial relation information for simultaneous PUCCH transmissions on different component carriers.

In the following description of the process flow 700, the operations may be performed (e.g., reported or provided) in a different order than the order shown, or the operations performed by the example devices may be performed in different orders or at different times. Some operations also may be left out of the process flow 700, or other operations may be added to the process flow 700. Further, although some operations or signaling may be shown to occur at different times for discussion purposes, these operations may actually occur at the same time.

At 705, the UE 115-c may, in some implementations, transmit a capability report to the network entity 105-b. The capability report may indicate whether the UE 115-c supports the use of same spatial relation information for simultaneous PUCCH transmissions on different component carriers or the use of different spatial relation information for simultaneous PUCCH transmissions on different component carriers, or both. For example, the capability report may indicate one or both of a first one or more pairs of PUCCH resources (or band pairs) over which the UE 115-c is capable of simultaneous PUCCH transmissions using different spatial relation information or a second one or more pairs of PUCCH resources (or band pairs) over which the UE 115-c is incapable of simultaneous PUCCH transmissions using different spatial relation information.

At 710, the UE 115-c may, in some implementations, transmit signaling indicating a mapping to the network entity 105-b. In some examples, the signaling may indicate a mapping between a first set of spatial relation information and a first antenna panel of the UE 115-c and between a second set of spatial relation information and a second antenna panel of the UE 115-c. In some examples, the UE 115-c may provide such a mapping in multi-panel or multi-TRP communication scenarios.

At 715, the UE 115-c may receive, from the network entity 105-b, signaling indicating spatial relation information associated with multiple PUCCH resources that span multiple component carriers. For example, the UE 115-c may support PUCCH transmissions on multiple component carriers, such as a PCC, an SCC-1, and an SCC-2, and the network entity 105-b may configure each PUCCH resource with spatial relation information. As such, if the UE 115-c is scheduled to transmit over a PUCCH resource, the UE 115-c may perform the transmission via a directional beam that is associated with spatial relation information that is configured for that PUCCH resource. In some implementations, the UE 115-c may receive, via such signaling or via different signaling (e.g., via either or both of MAC-CE signaling or RRC signaling), an indication of fallback spatial relation information that the UE 115-c may use if scheduled for simultaneous PUCCH transmissions on different component carriers.

At 720, the UE 115-c may receive, from the network entity 105-b, one or more messages scheduling a first uplink transmission over a first PUCCH resource that is associated with (e.g., located on) a first component carrier and a second uplink transmission over a second PUCCH resource that is associated with (e.g., located on) a second component carrier. In some examples, the first PUCCH resource and the second PUCCH resource may overlap in time and may be equivalently referred to herein as simultaneous PUCCH resources. Similarly, in such examples, the first uplink transmission and the second uplink transmission may be equivalently referred to herein as simultaneous PUCCH transmissions. Such a scheduling of simultaneous PUCCH transmissions on different component carriers is illustrated by and described in more detail with reference to FIGS. 2 and 3.

At 725, the UE 115-c may select spatial relation information for the first uplink transmission and for the second uplink transmission. In some examples, the UE 115-c may select spatial relation information for the simultaneous PUCCH transmissions in accordance with a spatial relation configuration that defines a spatial relation information selection rule according to which the UE 115-c selects spatial relation information for simultaneous PUCCH transmissions on different component carriers.

In some implementations, the UE 115-c may select same spatial relation information for both the first uplink transmission and the second uplink transmission as a result of a configured rule according to which the network entity 105-b configures same spatial relation information for PUCCH resources that overlap in time and that are located on different component carriers. In some other implementations, the UE 115-c may select same spatial relation information for both the first uplink transmission and the second uplink transmission as a result of a component carrier prioritization rule according to which the UE 115-c selects spatial relation information associated with the PUCCH resource that is located on a relatively higher priority component carrier (e.g., such as a PCC). In some other implementations, the UE 115-c may select same spatial relation information for both the first uplink transmission and the second uplink transmission as a result of selecting a fallback spatial relation information that is (exclusively) configured for scenarios in which the UE 115-c is scheduled for simultaneous PUCCH transmissions on different component carriers. In some other implementations, the UE 115-c may select different spatial relation information for the first uplink transmission and the second uplink transmission as a result of providing the network entity 105-b with an indication of the mapping at 710 (e.g., such that the network entity 105-b may avoid scheduling on overlapping PUCCH resources associated with spatial relation information that map to a same antenna panel of the UE 115-c.

At 730, the UE 115-c may transmit, based on the spatial relation information, the first uplink transmission over the first PUCCH resource and the second uplink transmission over the second PUCCH resource in accordance with the spatial relation configuration. The UE 115-c may transmit the simultaneous PUCCH transmissions to the network entity 105-b or to at least a component of the network entity 105-b (e.g., in examples in which the UE 115-c operates in a multi-TRP scenario). The UE 115-c may perform the first uplink transmission and the second uplink transmission either via a same directional beam (e.g., if same spatial relation information is selected) or via different directional beams (e.g., if different spatial relation information is selected).

Figure 8:
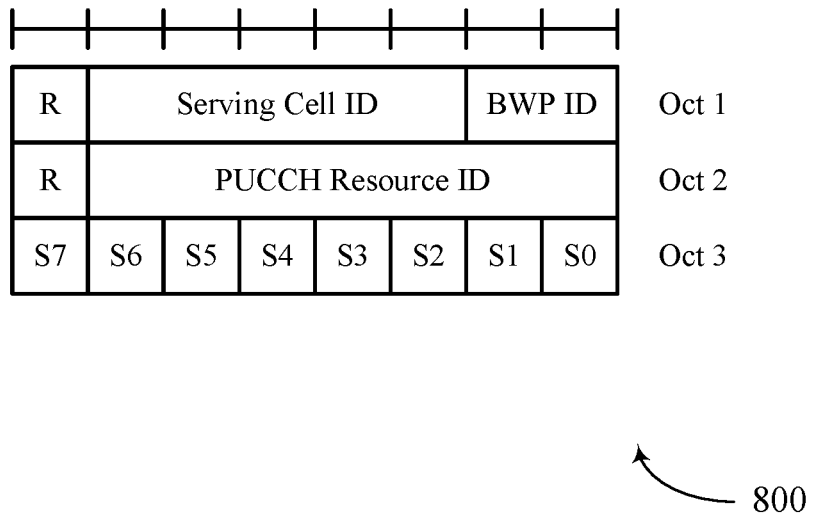
FIG. 8 illustrates examples of control elements that support techniques for selecting spatial relation information for simultaneous PUCCH resources across multiple component carriers in accordance with examples of the present disclosure.
Figure 8:
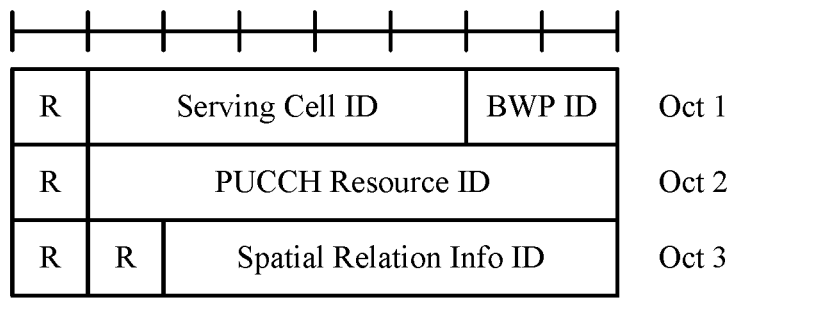
Figure 8:
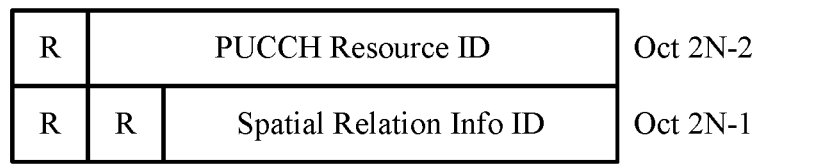

FIG. 8 illustrates example control elements 800 and 801 that support techniques for selecting spatial relation information for simultaneous PUCCH resources across multiple component carriers in accordance with examples of the present disclosure. The control elements 800 and 801 may implement or be implemented to realize aspects of the wireless communications system 100 or the wireless communications system 200. For example, a network entity 105 may transmit an indication of a spatial relation information configuration to a UE 115 that indicates which spatial relation information is associated with (e.g., configured for) each PUCCH resource that is configured at the UE 115, and such a UE 115 and a network entity 105 may be examples of corresponding devices described herein, including with reference to FIGS. 1 and 2. The control elements 800 and 801 may be examples of MAC-CEs that provide the spatial relation information configuration to the UE 115.

In some examples, the control element 800 may be equivalently referred to as a PUCCH spatial relation Activation/Deactivation MAC-CE and may include a number of fields to indicate spatial relation information for a PUCCH resource. For example, a serving cell ID field may indicate the identity of the serving cell for which the MAC-CE applies. The length of the serving cell ID field may be 5 bits. The BWP ID field may indicate an uplink BWP for which the MAC-CE applies as a codepoint of the DCI bandwidth-part indicator field. The length of the BWP ID field may be 2 bits. A PUCCH resource ID field may include an identifier of the PUCCH resource ID identified by PUCCH-ResourceId. The length of the PUCCH resource ID field may be 7 bits.

The control element 800 may also include a number of $S_i$ fields (such as 8 $S_i$ fields) that indicate whether a corresponding PUCCH-SpatialRelationInfoId i+1 is activated or deactivated. For example, if, in PUCCH-Config in which the PUCCH resource ID is configured, there is a PUCCH Spatial Relation Info with PUCCH-SpatialRelationInfoId, configured for the uplink bandwidth part indicated by BWP ID field, $S_i$ indicates the activation status of PUCCH Spatial Relation Info with PUCCH-SpatialRelationInfoId equal to i+1, otherwise the MAC entity may ignore this field. The $S_i$ field may be set to 1 to indicate PUCCH Spatial Relation Info with PUCCH-SpatialRelationInfoId equal to i+1 is activated. The $S_i$ field may be set to 0 to indicate PUCCH Spatial Relation Info with PUCCH-SpatialRelationInfoId equal to i+1 is deactivated. Only a single PUCCH Spatial Relation Info may be active for a PUCCH Resource at a time. The control element 800 may also include a number of reserved bits R that are set to 0.

In some examples, the control element 801 (e.g., one MAC-CE) may set PUCCH-spatialRelationInfo for a group of PUCCH resources and may include a number of fields to indicate spatial relation information for the group of PUCCH resources. For example, a serving cell ID field may indicate the identity of the serving cell for which the MAC-CE applies. The length of the serving cell ID field may be 5 bits. A BWP ID field may indicate an uplink BWP for which the MAC-CE applies as a codepoint of the DCI bandwidth part indicator field. The length of the BWP ID field may be 2 bits. A PUCCH resource ID field may include an identifier of the PUCCH resource ID identified by PUCCH-ResourceId, which may be activated with a spatial relation indicated by Spatial Relation Info ID field in the subsequent octet. The length of the field may be 7 bits. If the indicated PUCCH Resource ID is included in a PUCCH Resource Group (configured via resourceGroupToAddModList-r16) of the indicated UL BWP, no other PUCCH Resources within the same PUCCH Resource group may be indicated in the MAC-CE, and this MAC-CE may apply to the PUCCH resources (e.g., all the PUCCH resources) in the PUCCH resource group.

A Spatial Relation Info ID field may include PUCCH-SpatialRelationInfoId−1 where PUCCH-SpatialRelationInfoId is the identifier of the PUCCH Spatial Relation Info in PUCCH-Config in which the PUCCH Resource ID is configured. The length of the field may be 6 bits. The control element 801 may also include a number of reserved bits R that are set to 0.

Figure 9:
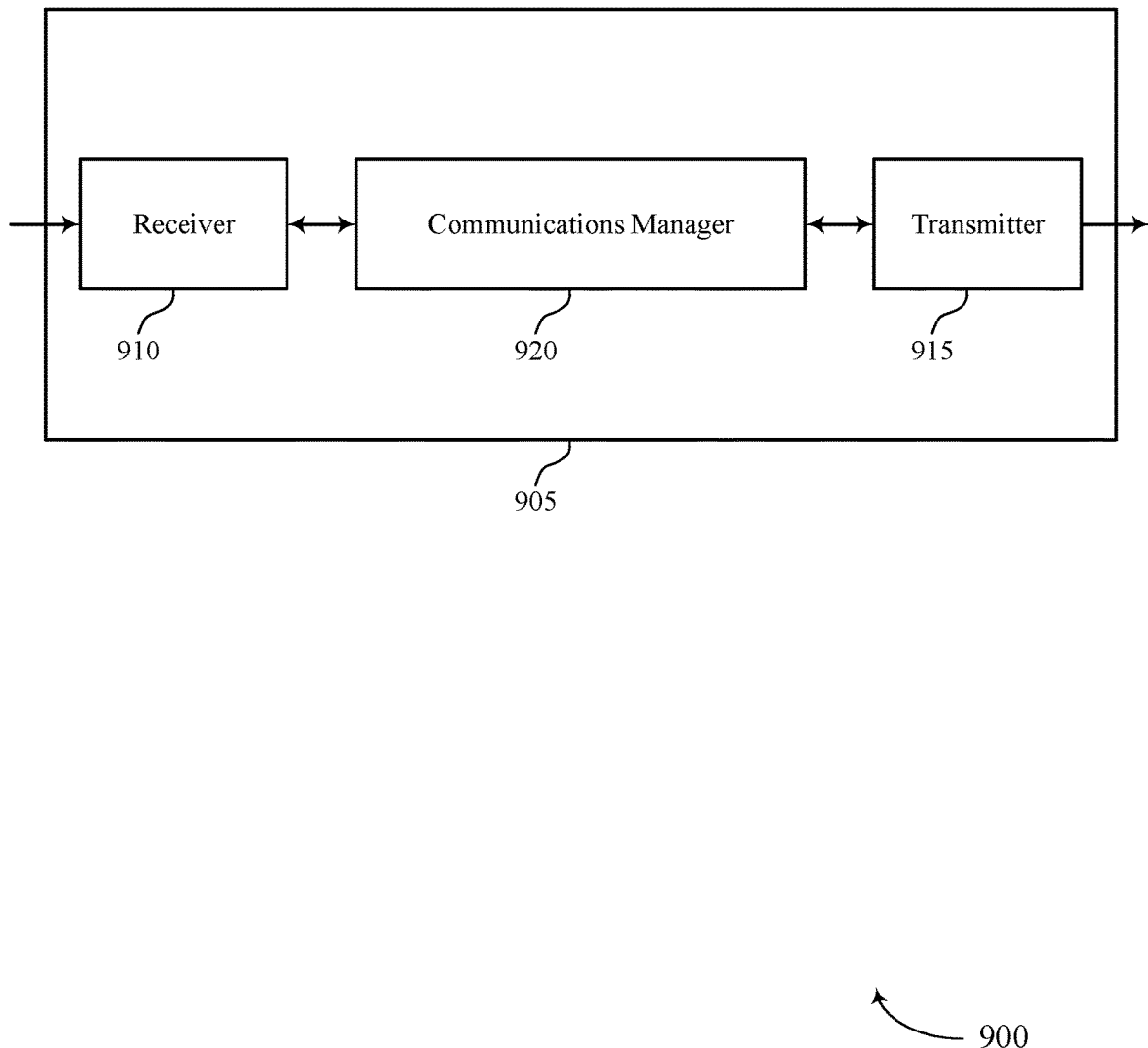
FIGS. 9 and 10 show block diagrams of devices that support techniques for selecting spatial relation information for simultaneous PUCCH resources across multiple component carriers in accordance with examples of the present disclosure.

FIG. 9 shows a block diagram 900 of a device 905 that supports techniques for selecting spatial relation information for simultaneous PUCCH resources across multiple component carriers in accordance with examples of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for selecting spatial relation information for simultaneous PUCCH resources across multiple component carriers). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for selecting spatial relation information for simultaneous PUCCH resources across multiple component carriers). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for selecting spatial relation information for simultaneous PUCCH resources across multiple component carriers as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving, from a network entity, signaling indicating spatial relation information associated with a set of multiple uplink control channel resources, where the set of multiple uplink control channel resources span a set of multiple component carriers. The communications manager 920 may be configured as or otherwise support a means for receiving, from the network entity, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time. The communications manager 920 may be configured as or otherwise support a means for transmitting, based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources.

Figure 10:
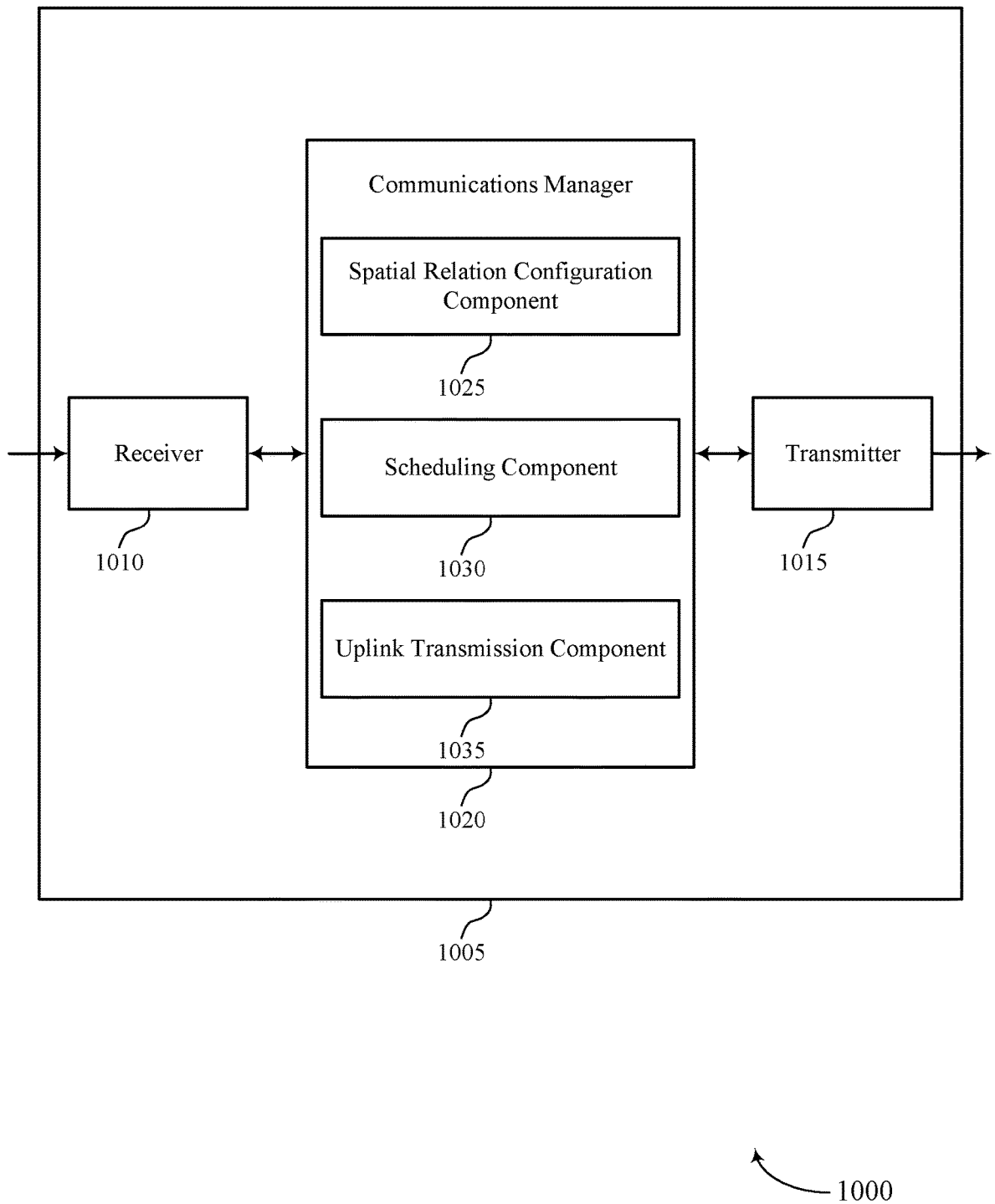

FIG. 10 shows a block diagram 1000 of a device 1005 that supports techniques for selecting spatial relation information for simultaneous PUCCH resources across multiple component carriers in accordance with examples of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for selecting spatial relation information for simultaneous PUCCH resources across multiple component carriers). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for selecting spatial relation information for simultaneous PUCCH resources across multiple component carriers). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for selecting spatial relation information for simultaneous PUCCH resources across multiple component carriers as described herein. For example, the communications manager 1020 may include a spatial relation configuration component 1025, a scheduling component 1030, an uplink transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The spatial relation configuration component 1025 may be configured as or otherwise support a means for receiving, from a network entity, signaling indicating spatial relation information associated with a set of multiple uplink control channel resources, where the set of multiple uplink control channel resources span a set of multiple component carriers. The scheduling component 1030 may be configured as or otherwise support a means for receiving, from the network entity, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time. The uplink transmission component 1035 may be configured as or otherwise support a means for transmitting, based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

Figure 11:
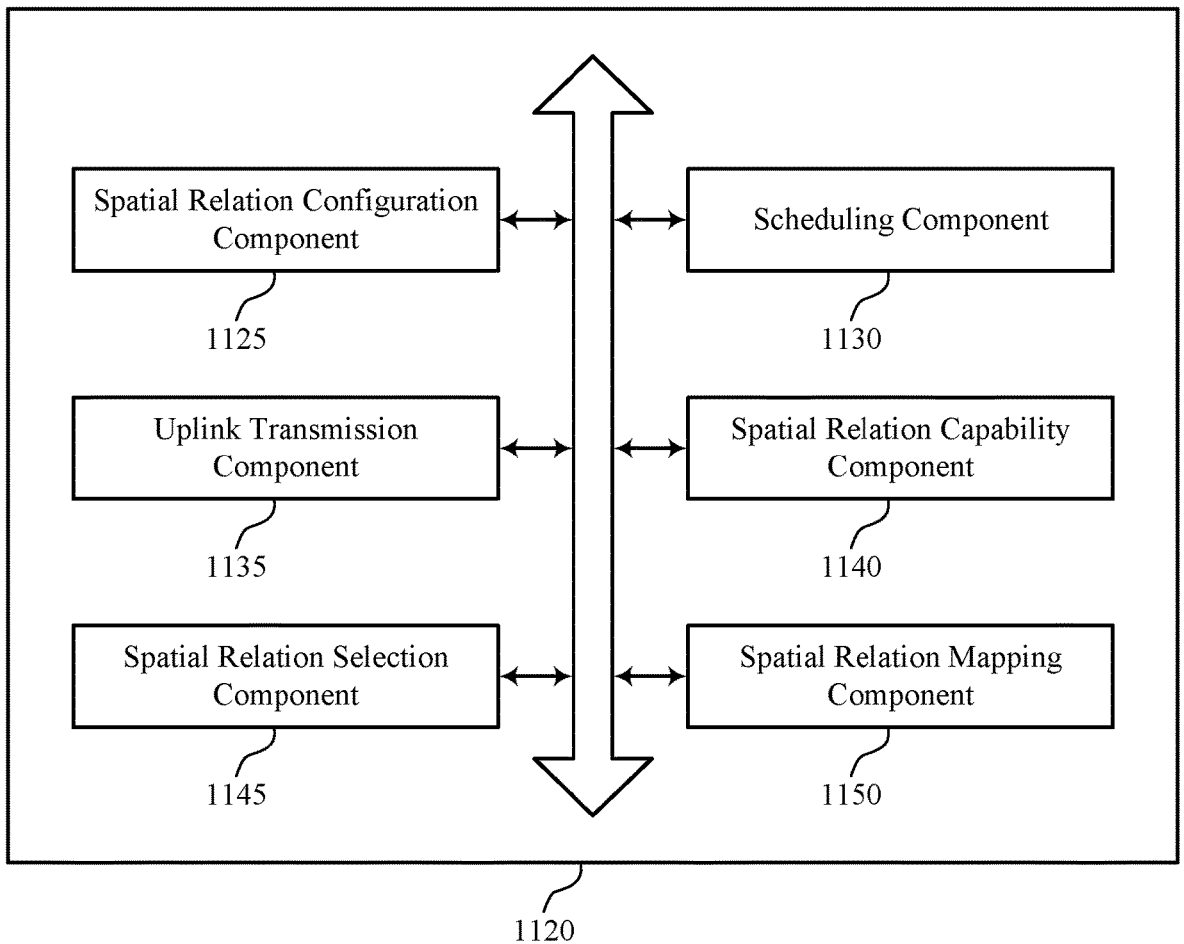
FIG. 11 shows a block diagram of a communications manager that supports techniques for selecting spatial relation information for simultaneous PUCCH resources across multiple component carriers in accordance with examples of the present disclosure.

FIG. 11 shows a block diagram 1100 of a communications manager 1120 that supports techniques for selecting spatial relation information for simultaneous PUCCH resources across multiple component carriers in accordance with examples of the present disclosure. The communications manager 1120 may be an example of aspects of a communications manager 920, a communications manager 1020, or both, as described herein. The communications manager 1120, or various components thereof, may be an example of means for performing various aspects of techniques for selecting spatial relation information for simultaneous PUCCH resources across multiple component carriers as described herein. For example, the communications manager 1120 may include a spatial relation configuration component 1125, a scheduling component 1130, an uplink transmission component 1135, a spatial relation capability component 1140, a spatial relation selection component 1145, a spatial relation mapping component 1150, or any combination thereof. Each of these components may communicate, directly or indirectly, with one another (e.g., via one or more buses).

The communications manager 1120 may support wireless communication at a UE in accordance with examples as disclosed herein. The spatial relation configuration component 1125 may be configured as or otherwise support a means for receiving, from a network entity, signaling indicating spatial relation information associated with a set of multiple uplink control channel resources, where the set of multiple uplink control channel resources span a set of multiple component carriers. The scheduling component 1130 may be configured as or otherwise support a means for receiving, from the network entity, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time. The uplink transmission component 1135 may be configured as or otherwise support a means for transmitting, based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

In some examples, to support receiving the signaling indicating the spatial relation information associated with the set of multiple uplink control channel resources, the spatial relation configuration component 1125 may be configured as or otherwise support a means for receiving an indication of a same spatial relation information for both the first uplink control channel resource and the second uplink control channel resource based on the spatial relation configuration and as a result of the first uplink control channel resource and the second uplink control channel resource overlapping in time.

In some examples, to support transmitting the first uplink transmission over the first uplink control channel resource and the second uplink transmission over the second uplink control channel resource, the uplink transmission component 1135 may be configured as or otherwise support a means for transmitting the first uplink transmission over the first uplink control channel resource and the second uplink transmission over the second uplink control channel resource via a same directional beam associated with the same spatial relation information.

In some examples, the spatial relation configuration defines that uplink control channel resources of the set of multiple uplink control channel resources that overlap in time and are associated with different component carriers are configured with same spatial relation information.

In some examples, to support receiving the signaling indicating the spatial relation information associated with the set of multiple uplink control channel resources, the spatial relation configuration component 1125 may be configured as or otherwise support a means for receiving an indication of a first spatial relation information for the first uplink control channel resource and a second spatial relation information for the second uplink control channel resource.

In some examples, the spatial relation selection component 1145 may be configured as or otherwise support a means for selecting the first spatial relation information for both the first uplink control channel resource and the second uplink control channel resource based on the spatial relation configuration and as a result of the first uplink control channel resource and the second uplink control channel resource overlapping in time, where transmitting the first uplink transmission over the first uplink control channel resource and the second uplink transmission over the second uplink control channel resource is based on selecting the first spatial relation information for both the first uplink control channel resource and the second uplink control channel resource.

In some examples, to support transmitting the first uplink transmission over the first uplink control channel resource and the second uplink transmission over the second uplink control channel resource, the uplink transmission component 1135 may be configured as or otherwise support a means for transmitting the first uplink transmission over the first uplink control channel resource and the second uplink transmission over the second uplink control channel resource via a directional beam associated with the first spatial relation information.

In some examples, the spatial relation configuration defines a priority for each of the set of multiple component carriers. In some examples, the first spatial relation information is selected as a result of the first component carrier associated with the first uplink control channel resource having a relatively higher priority than the second component carrier associated with the second uplink control channel resource.

In some examples, the spatial relation mapping component 1150 may be configured as or otherwise support a means for transmitting, to the network entity, signaling indicating a mapping between a first set of spatial relation information including the first spatial relation information and a first antenna panel of the UE and between a second set of spatial relation information including the second spatial relation information and a second antenna panel of the UE, where receiving the indication of the first spatial relation information for the first uplink control channel resource and the second spatial relation information for the second uplink control channel resource is based on the mapping.

In some examples, to support transmitting the first uplink transmission over the first uplink control channel resource and the second uplink transmission over the second uplink control channel resource, the uplink transmission component 1135 may be configured as or otherwise support a means for transmitting the first uplink transmission over the first uplink control channel resource via a first directional beam associated with the first spatial relation information. In some examples, to support transmitting the first uplink transmission over the first uplink control channel resource and the second uplink transmission over the second uplink control channel resource, the uplink transmission component 1135 may be configured as or otherwise support a means for transmitting the second uplink transmission over the second uplink control channel resource via a second directional beam associated with the second spatial relation information.

In some examples, to support receiving the signaling indicating the spatial relation information associated with the set of multiple uplink control channel resources, the spatial relation configuration component 1125 may be configured as or otherwise support a means for receiving an indication of one or more fallback spatial relation information corresponding to the spatial relation configuration, each fallback spatial relation information for at least one slot of a number of slots.

In some examples, the spatial relation selection component 1145 may be configured as or otherwise support a means for selecting a first fallback spatial relation information for both the first uplink control channel resource and the second uplink control channel resource based on the spatial relation configuration and as a result of the first uplink control channel resource and the second uplink control channel resource overlapping in a first slot, where transmitting the first uplink transmission over the first uplink control channel resource and the second uplink transmission over the second uplink control channel resource is based on selecting the first fallback spatial relation information for both the first uplink control channel resource and the second uplink control channel resource.

In some examples, to support transmitting the first uplink transmission over the first uplink control channel resource and the second uplink transmission over the second uplink control channel resource, the uplink transmission component 1135 may be configured as or otherwise support a means for transmitting the first uplink transmission over the first uplink control channel resource and the second uplink transmission over the second uplink control channel resource via a directional beam associated with the first fallback spatial relation information.

In some examples, the spatial relation capability component 1140 may be configured as or otherwise support a means for transmitting, to the network entity, a capability report indicating one or both of a first one or more pairs of uplink control channel resources over which the UE is capable of simultaneous uplink transmissions using different spatial relation information or a second one or more pairs of uplink control channel resources over which the UE is incapable of simultaneous uplink transmissions using different spatial relation information, where receiving one or both of the signaling or the one or more messages scheduling the first uplink transmission and the second uplink transmission is based on the capability report.

Figure 12:
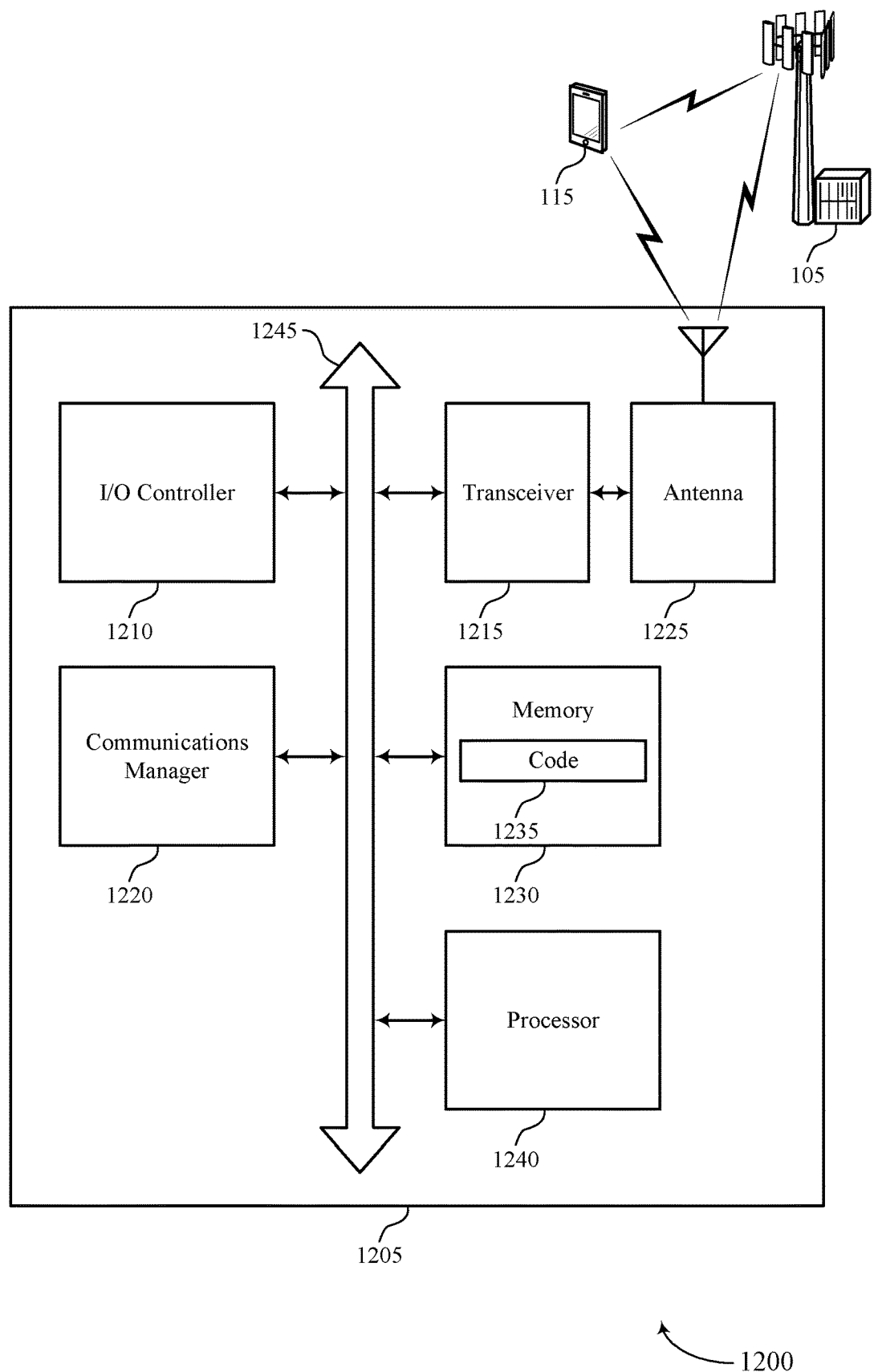
FIG. 12 shows a diagram of a system including a device that supports techniques for selecting spatial relation information for simultaneous PUCCH resources across multiple component carriers in accordance with examples of the present disclosure.

FIG. 12 shows a diagram of a system 1200 including a device 1205 that supports techniques for selecting spatial relation information for simultaneous PUCCH resources across multiple component carriers in accordance with examples of the present disclosure. The device 1205 may be an example of or include the components of a device 905, a device 1005, or a UE 115 as described herein. The device 1205 may communicate wirelessly with one or more network entities 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for selecting spatial relation information for simultaneous PUCCH resources across multiple component carriers). For example, the device 1205 or a component of the device 1205 may include a processor 1240 and memory 1230 coupled with the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving, from a network entity, signaling indicating spatial relation information associated with a set of multiple uplink control channel resources, where the set of multiple uplink control channel resources span a set of multiple component carriers. The communications manager 1220 may be configured as or otherwise support a means for receiving, from the network entity, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time. The communications manager 1220 may be configured as or otherwise support a means for transmitting, based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for selecting spatial relation information for simultaneous PUCCH resources across multiple component carriers as described herein, or the processor 1240 and the memory 1230 may be otherwise configured to perform or support such operations.

Figure 13:
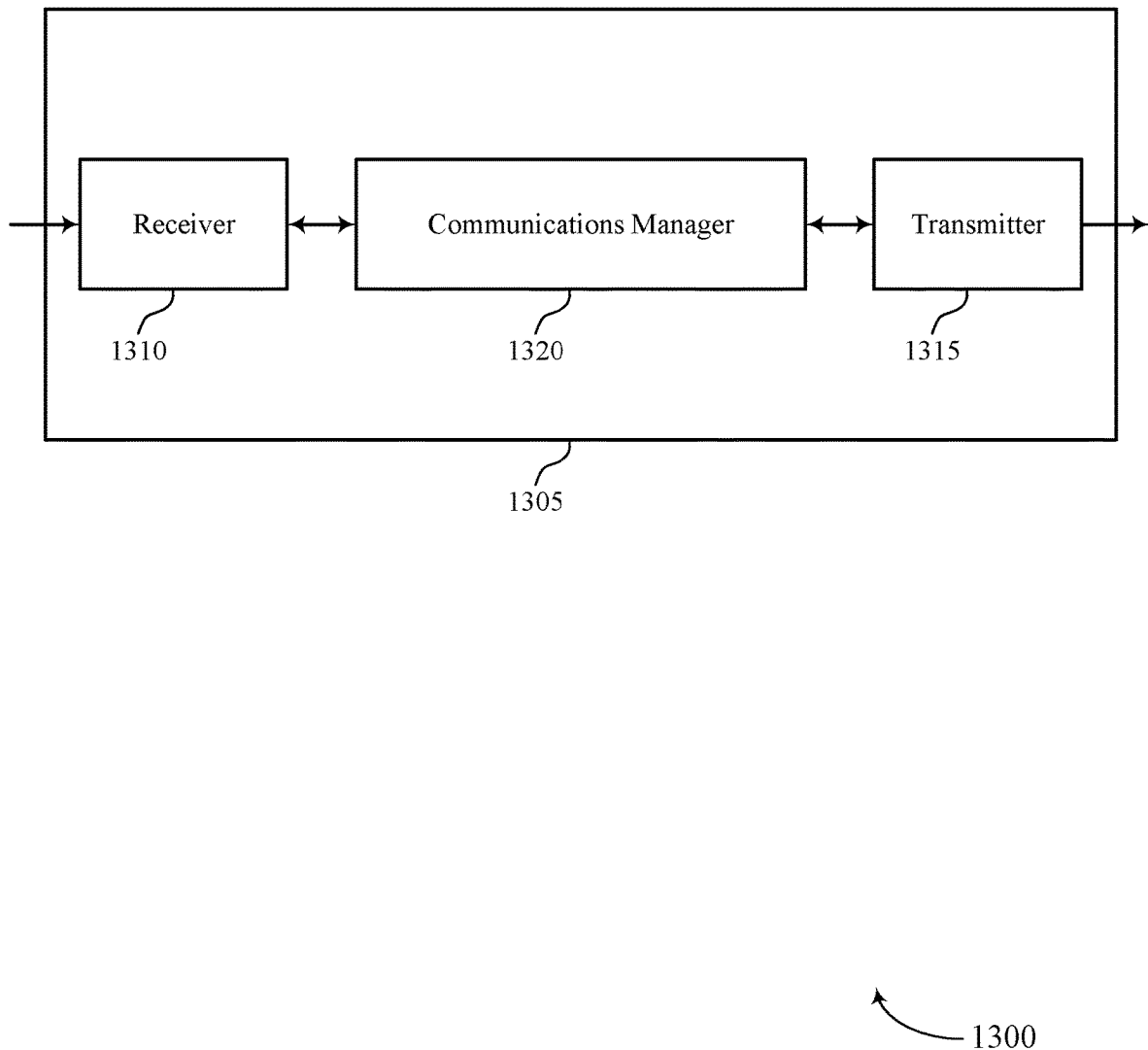
FIGS. 13 and 14 show block diagrams of devices that support techniques for selecting spatial relation information for simultaneous PUCCH resources across multiple component carriers in accordance with examples of the present disclosure.

FIG. 13 shows a block diagram 1300 of a device 1305 that supports techniques for selecting spatial relation information for simultaneous PUCCH resources across multiple component carriers in accordance with examples of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for selecting spatial relation information for simultaneous PUCCH resources across multiple component carriers). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for selecting spatial relation information for simultaneous PUCCH resources across multiple component carriers). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of techniques for selecting spatial relation information for simultaneous PUCCH resources across multiple component carriers as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at network entity in accordance with examples as disclosed herein. For example, the communications manager 1320 may be configured as or otherwise support a means for transmitting, to a UE, signaling indicating spatial relation information associated with a set of multiple uplink control channel resources, where the set of multiple uplink control channel resources span a set of multiple component carriers. The communications manager 1320 may be configured as or otherwise support a means for transmitting, to the UE, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time. The communications manager 1320 may be configured as or otherwise support a means for receiving, via one or more components of the network entity and based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced processing, reduced power consumption, and more efficient utilization of communication resources.

Figure 14:
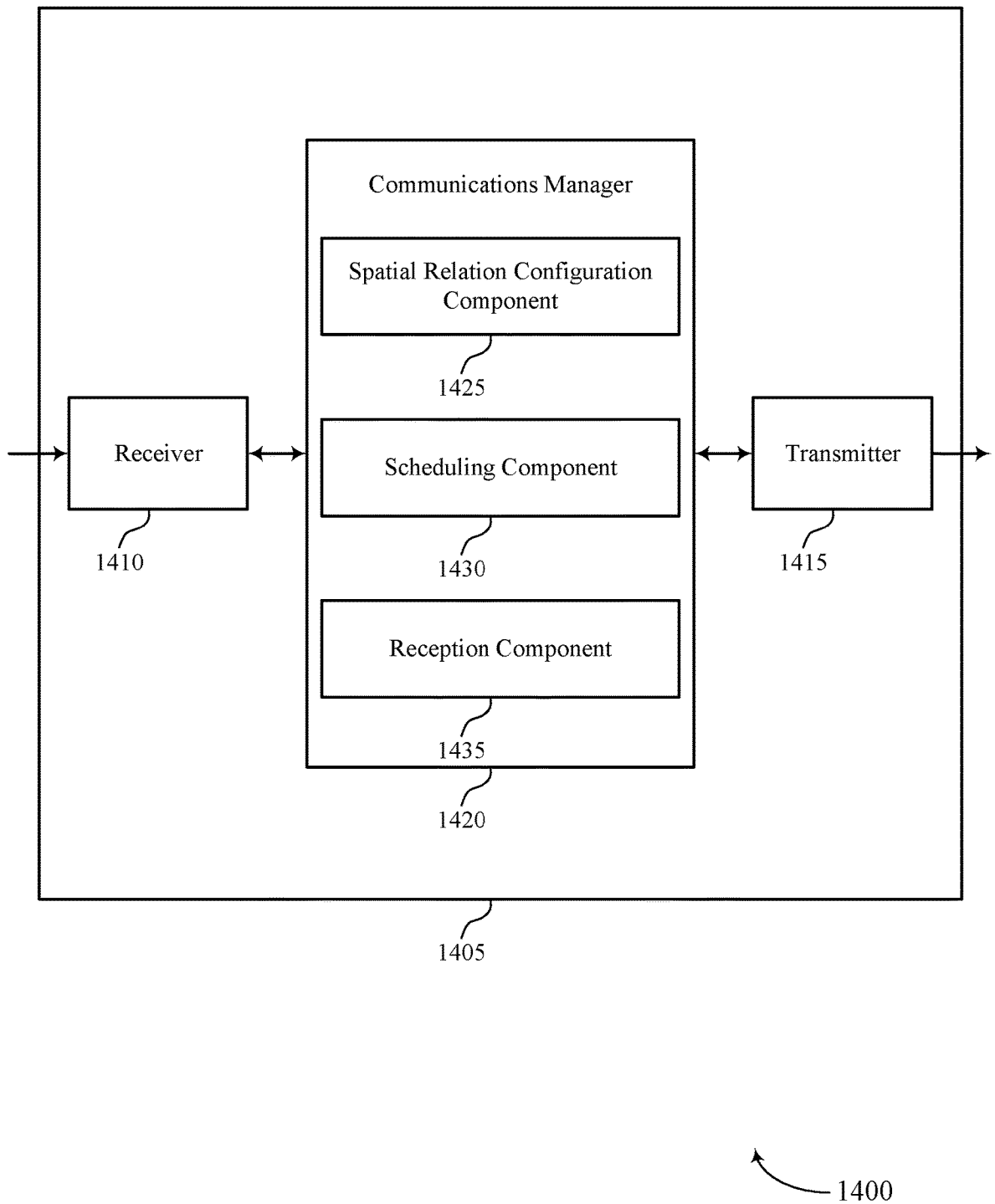

FIG. 14 shows a block diagram 1400 of a device 1405 that supports techniques for selecting spatial relation information for simultaneous PUCCH resources across multiple component carriers in accordance with examples of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for selecting spatial relation information for simultaneous PUCCH resources across multiple component carriers). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for selecting spatial relation information for simultaneous PUCCH resources across multiple component carriers). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of techniques for selecting spatial relation information for simultaneous PUCCH resources across multiple component carriers as described herein. For example, the communications manager 1420 may include a spatial relation configuration component 1425, a scheduling component 1430, a reception component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at network entity in accordance with examples as disclosed herein. The spatial relation configuration component 1425 may be configured as or otherwise support a means for transmitting, to a UE, signaling indicating spatial relation information associated with a set of multiple uplink control channel resources, where the set of multiple uplink control channel resources span a set of multiple component carriers. The scheduling component 1430 may be configured as or otherwise support a means for transmitting, to the UE, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time. The reception component 1435 may be configured as or otherwise support a means for receiving, via one or more components of the network entity and based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

Figure 15:
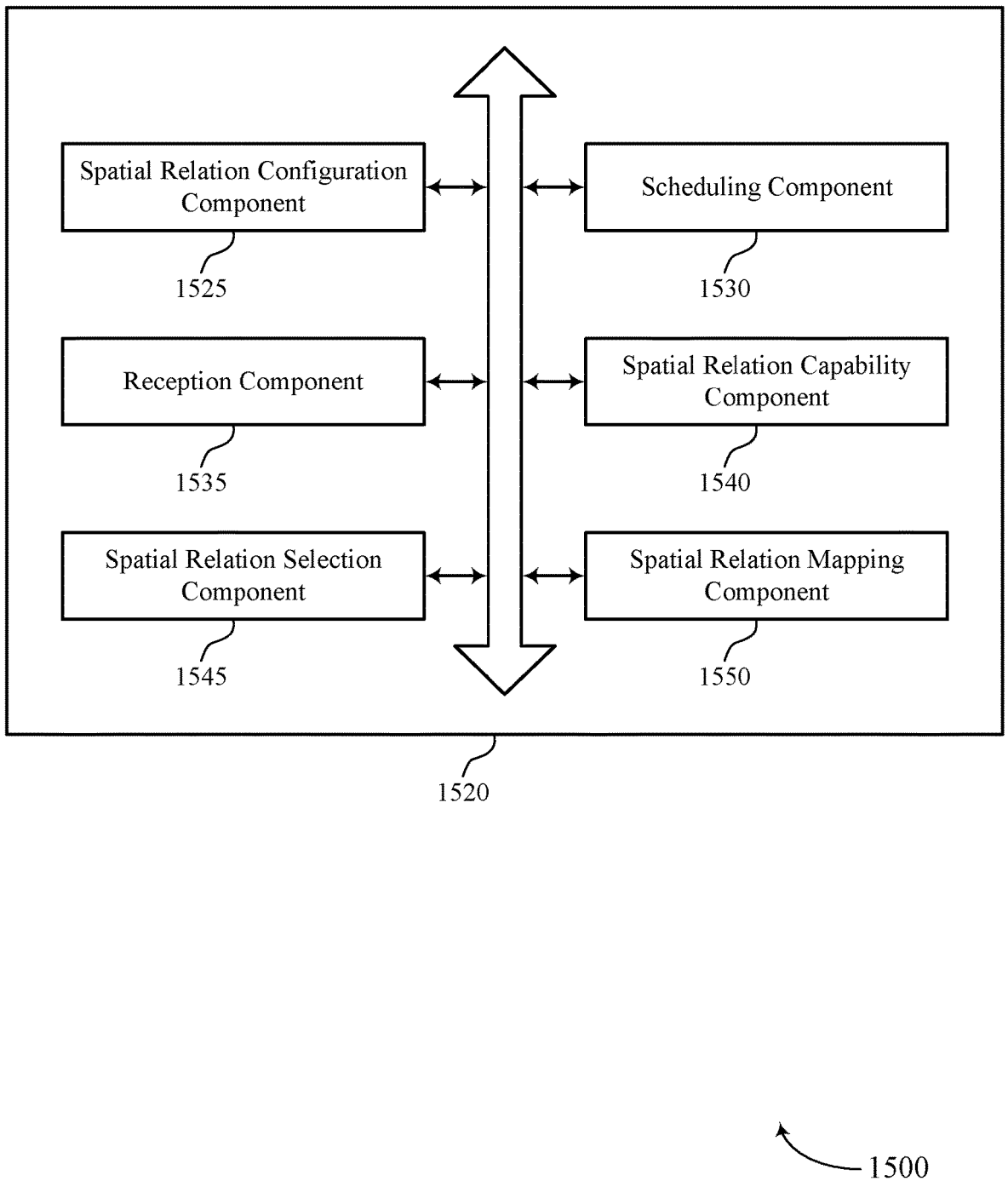
FIG. 15 shows a block diagram of a communications manager that supports techniques for selecting spatial relation information for simultaneous PUCCH resources across multiple component carriers in accordance with examples of the present disclosure.

FIG. 15 shows a block diagram 1500 of a communications manager 1520 that supports techniques for selecting spatial relation information for simultaneous PUCCH resources across multiple component carriers in accordance with examples of the present disclosure. The communications manager 1520 may be an example of aspects of a communications manager 1320, a communications manager 1420, or both, as described herein. The communications manager 1520, or various components thereof, may be an example of means for performing various aspects of techniques for selecting spatial relation information for simultaneous PUCCH resources across multiple component carriers as described herein. For example, the communications manager 1520 may include a spatial relation configuration component 1525, a scheduling component 1530, a reception component 1535, a spatial relation capability component 1540, a spatial relation selection component 1545, a spatial relation mapping component 1550, or any combination thereof. Each of these components may communicate, directly or indirectly, with one another (e.g., via one or more buses).

The communications manager 1520 may support wireless communication at network entity in accordance with examples as disclosed herein. The spatial relation configuration component 1525 may be configured as or otherwise support a means for transmitting, to a UE, signaling indicating spatial relation information associated with a set of multiple uplink control channel resources, where the set of multiple uplink control channel resources span a set of multiple component carriers. The scheduling component 1530 may be configured as or otherwise support a means for transmitting, to the UE, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time. The reception component 1535 may be configured as or otherwise support a means for receiving, via one or more components of the network entity and based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

In some examples, to support transmitting the signaling indicating the spatial relation information associated with the set of multiple uplink control channel resources, the spatial relation configuration component 1525 may be configured as or otherwise support a means for transmitting an indication of a same spatial relation information for both the first uplink control channel resource and the second uplink control channel resource based on the spatial relation configuration and as a result of the first uplink control channel resource and the second uplink control channel resource overlapping in time.

In some examples, to support receiving the first uplink transmission over the first uplink control channel resource and the second uplink transmission over the second uplink control channel resource, the reception component 1535 may be configured as or otherwise support a means for receiving the first uplink transmission over the first uplink control channel resource and the second uplink transmission over the second uplink control channel resource via a same directional beam associated with the same spatial relation information.

In some examples, the spatial relation configuration defines that uplink control channel resources of the set of multiple uplink control channel resources that overlap in time and are associated with different component carriers are configured with same spatial relation information.

In some examples, to support transmitting the signaling indicating the spatial relation information associated with the set of multiple uplink control channel resources, the spatial relation configuration component 1525 may be configured as or otherwise support a means for transmitting an indication of a first spatial relation information for the first uplink control channel resource and a second spatial relation information for the second uplink control channel resource.

In some examples, the spatial relation selection component 1545 may be configured as or otherwise support a means for selecting the first spatial relation information for both the first uplink control channel resource and the second uplink control channel resource based on the spatial relation configuration and as a result of the first uplink control channel resource and the second uplink control channel resource overlapping in time, where receiving the first uplink transmission over the first uplink control channel resource and the second uplink transmission over the second uplink control channel resource is based on selecting the first spatial relation information for both the first uplink control channel resource and the second uplink control channel resource.

In some examples, to support receiving the first uplink transmission over the first uplink control channel resource and the second uplink transmission over the second uplink control channel resource, the reception component 1535 may be configured as or otherwise support a means for receiving the first uplink transmission over the first uplink control channel resource and the second uplink transmission over the second uplink control channel resource via a directional beam associated with the first spatial relation information.

In some examples, the spatial relation configuration defines a priority for each of the set of multiple component carriers. In some examples, the first spatial relation information is selected as a result of the first component carrier associated with the first uplink control channel resource having a relatively higher priority than the second component carrier associated with the second uplink control channel resource.

In some examples, the spatial relation mapping component 1550 may be configured as or otherwise support a means for receiving, from the UE, signaling indicating a mapping between a first set of spatial relation information including the first spatial relation information and a first antenna panel of the UE and between a second set of spatial relation information including the second spatial relation information and a second antenna panel of the UE, where transmitting the indication of the first spatial relation information for the first uplink control channel resource and the second spatial relation information for the second uplink control channel resource is based on the mapping.

In some examples, to support receiving the first uplink transmission over the first uplink control channel resource and the second uplink transmission over the second uplink control channel resource, the reception component 1535 may be configured as or otherwise support a means for receiving, via a first component of the one or more components of the network entity, the first uplink transmission over the first uplink control channel resource via a first directional beam associated with the first spatial relation information. In some examples, to support receiving the first uplink transmission over the first uplink control channel resource and the second uplink transmission over the second uplink control channel resource, the reception component 1535 may be configured as or otherwise support a means for receiving, via a second component of the one or more components of the network entity, the second uplink transmission over the second uplink control channel resource via a second directional beam associated with the second spatial relation information.

In some examples, to support transmitting the signaling indicating the spatial relation information associated with the set of multiple uplink control channel resources, the spatial relation configuration component 1525 may be configured as or otherwise support a means for transmitting an indication of one or more fallback spatial relation information corresponding to the spatial relation configuration, each fallback spatial relation information for at least one slot of a number of slots.

In some examples, the spatial relation selection component 1545 may be configured as or otherwise support a means for selecting a first fallback spatial relation information for both the first uplink control channel resource and the second uplink control channel resource based on the spatial relation configuration and as a result of the first uplink control channel resource and the second uplink control channel resource overlapping in a first slot, where receiving the first uplink transmission over the first uplink control channel resource and the second uplink transmission over the second uplink control channel resource is based on selecting the first fallback spatial relation information for both the first uplink control channel resource and the second uplink control channel resource.

In some examples, to support receiving the first uplink transmission over the first uplink control channel resource and the second uplink transmission over the second uplink control channel resource, the reception component 1535 may be configured as or otherwise support a means for receiving the first uplink transmission over the first uplink control channel resource and the second uplink transmission over the second uplink control channel resource via a directional beam associated with the first fallback spatial relation information.

In some examples, the spatial relation capability component 1540 may be configured as or otherwise support a means for receiving, from the UE, a capability report indicating one or both of a first one or more pairs of uplink control channel resources over which the UE is capable of simultaneous uplink transmissions using different spatial relation information and a second one or more pairs of uplink control channel resources over which the UE is incapable of simultaneous uplink transmissions using different spatial relation information, where transmitting one or both of the signaling or the one or more messages scheduling the first uplink transmission and the second uplink transmission is based on the capability report.

Figure 16:
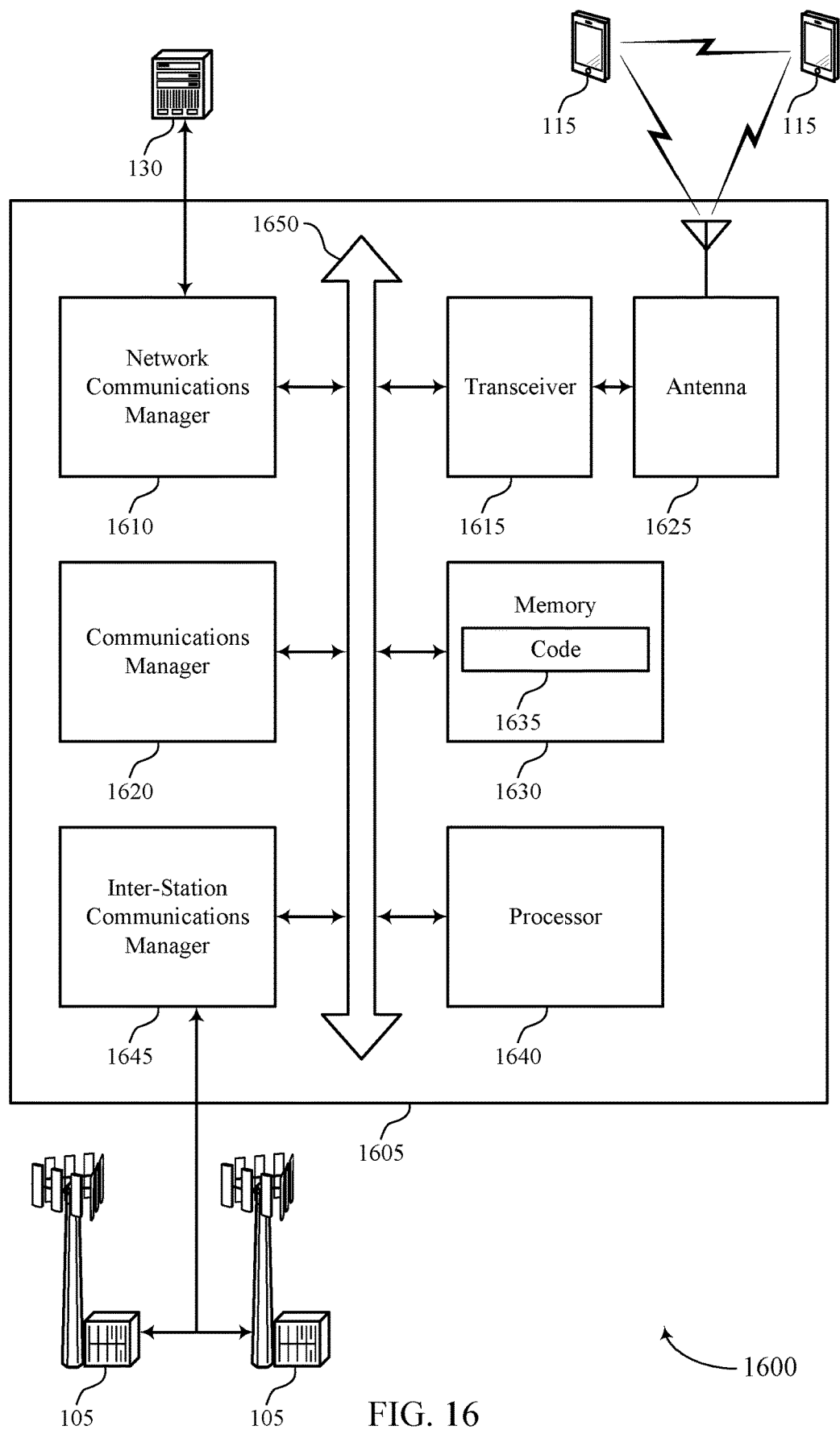
FIG. 16 shows a diagram of a system including a device that supports techniques for selecting spatial relation information for simultaneous PUCCH resources across multiple component carriers in accordance with examples of the present disclosure.

FIG. 16 shows a diagram of a system 1600 including a device 1605 that supports techniques for selecting spatial relation information for simultaneous PUCCH resources across multiple component carriers in accordance with examples of the present disclosure. The device 1605 may be an example of or include the components of a device 1305, a device 1405, or a network entity 105 as described herein. The device 1605 may communicate wirelessly with one or more network entities 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for selecting spatial relation information for simultaneous PUCCH resources across multiple component carriers). For example, the device 1605 or a component of the device 1605 may include a processor 1640 and memory 1630 coupled with the processor 1640, the processor 1640 and memory 1630 configured to perform various functions described herein.

The inter-station communications manager 1645 may manage communications with other network entities 105, and may include a controller or scheduler for controlling communications with UEs 115 in cooperation with other network entities 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between network entities 105.

The communications manager 1620 may support wireless communication at network entity in accordance with examples as disclosed herein. For example, the communications manager 1620 may be configured as or otherwise support a means for transmitting, to a UE, signaling indicating spatial relation information associated with a set of multiple uplink control channel resources, where the set of multiple uplink control channel resources span a set of multiple component carriers. The communications manager 1620 may be configured as or otherwise support a means for transmitting, to the UE, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time. The communications manager 1620 may be configured as or otherwise support a means for receiving, via one or more components of the network entity and based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

By including or configuring the communications manager 1620 in accordance with examples as described herein, the device 1605 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of techniques for selecting spatial relation information for simultaneous PUCCH resources across multiple component carriers as described herein, or the processor 1640 and the memory 1630 may be otherwise configured to perform or support such operations.

Figure 17:
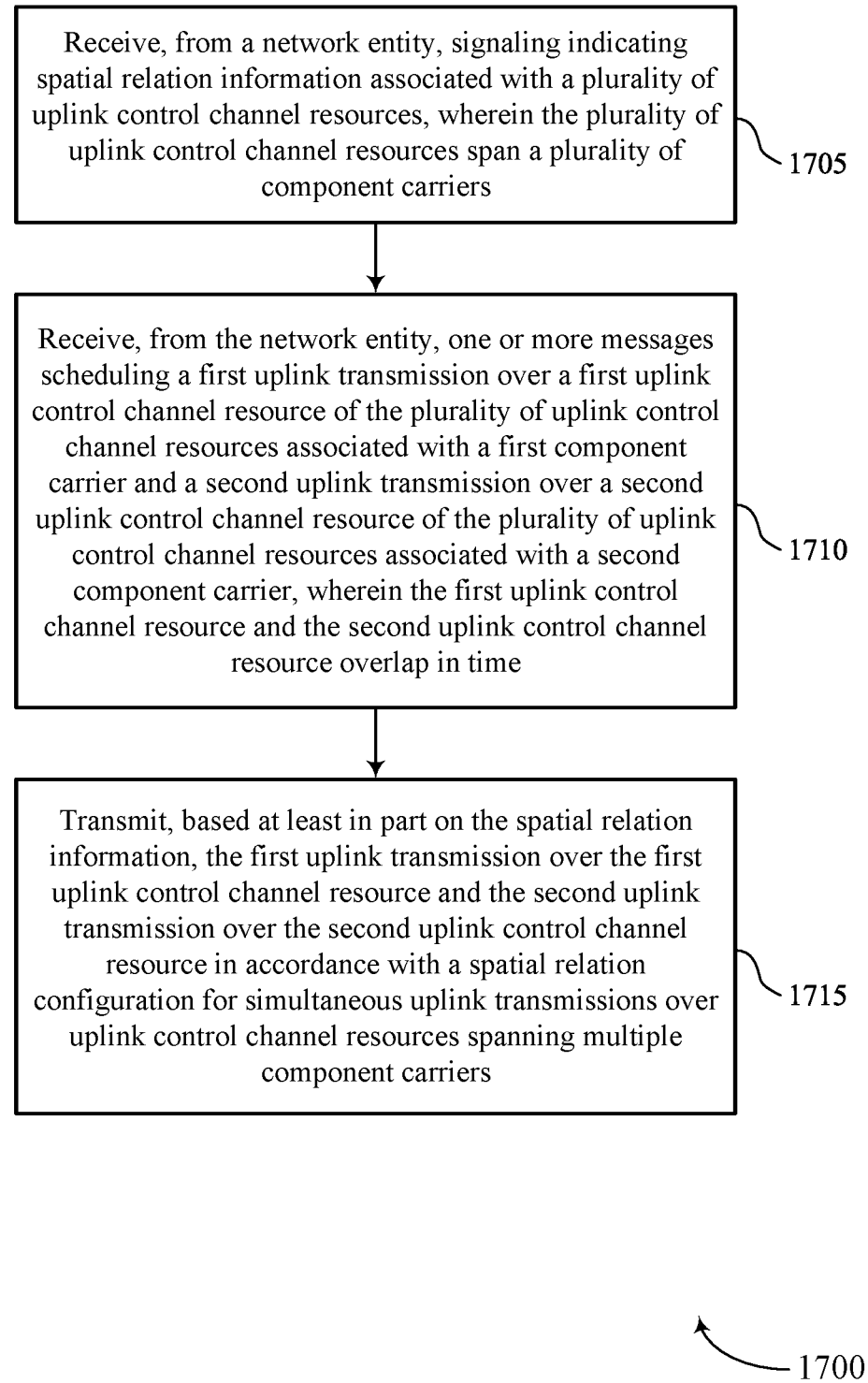
FIGS. 17 and 18 show flowcharts illustrating methods that support techniques for selecting spatial relation information for simultaneous PUCCH resources across multiple component carriers in accordance with examples of the present disclosure.

FIG. 17 shows a flowchart illustrating a method 1700 that supports techniques for selecting spatial relation information for simultaneous PUCCH resources across multiple component carriers in accordance with examples of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving, from a network entity, signaling indicating spatial relation information associated with a set of multiple uplink control channel resources, where the set of multiple uplink control channel resources span a set of multiple component carriers. The operations of 1705 may be performed in accordance with examples as disclosed herein. In some examples, aspects of the operations of 1705 may be performed by a spatial relation configuration component 1125 as described with reference to FIG. 11.

At 1710, the method may include receiving, from the network entity, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time. The operations of 1710 may be performed in accordance with examples as disclosed herein. In some examples, aspects of the operations of 1710 may be performed by a scheduling component 1130 as described with reference to FIG. 11.

At 1715, the method may include transmitting, based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers. The operations of 1715 may be performed in accordance with examples as disclosed herein. In some examples, aspects of the operations of 1715 may be performed by an uplink transmission component 1135 as described with reference to FIG. 11.

Figure 18:
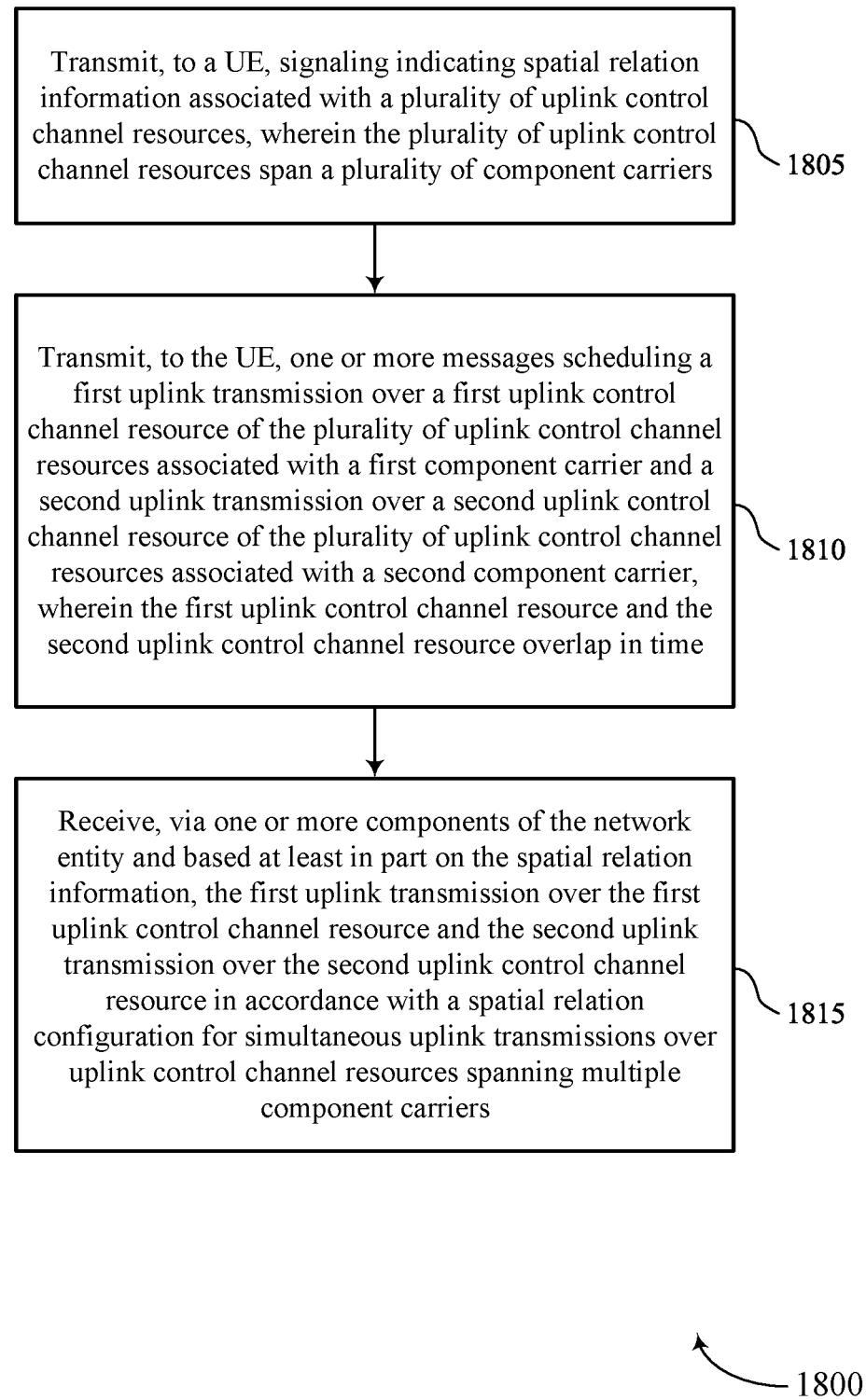

FIG. 18 shows a flowchart illustrating a method 1800 that supports techniques for selecting spatial relation information for simultaneous PUCCH resources across multiple component carriers in accordance with examples of the present disclosure. The operations of the method 1800 may be implemented by a network entity or its components as described herein. For example, the operations of the method 1800 may be performed by a network entity 105 as described with reference to FIGS. 1 through 8 and 13 through 16. In some examples, a network entity may execute a set of instructions to control the functional elements of the network entity to perform the described functions. Additionally or alternatively, the network entity may perform aspects of the described functions using special-purpose hardware.

At 1805, the method may include transmitting, to a UE, signaling indicating spatial relation information associated with a set of multiple uplink control channel resources, where the set of multiple uplink control channel resources span a set of multiple component carriers. The operations of 1805 may be performed in accordance with examples as disclosed herein. In some examples, aspects of the operations of 1805 may be performed by a spatial relation configuration component 1525 as described with reference to FIG. 15.

At 1810, the method may include transmitting, to the UE, one or more messages scheduling a first uplink transmission over a first uplink control channel resource of the set of multiple uplink control channel resources associated with a first component carrier and a second uplink transmission over a second uplink control channel resource of the set of multiple uplink control channel resources associated with a second component carrier, where the first uplink control channel resource and the second uplink control channel resource overlap in time. The operations of 1810 may be performed in accordance with examples as disclosed herein. In some examples, aspects of the operations of 1810 may be performed by a scheduling component 1530 as described with reference to FIG. 15.

At 1815, the method may include receiving, via one or more components of the network entity and based on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers. The operations of 1815 may be performed in accordance with examples as disclosed herein. In some examples, aspects of the operations of 1815 may be performed by a reception component 1535 as described with reference to FIG. 15.

The following provides an overview of aspects of the present disclosure:

Aspect 1: A method for wireless communication at a UE, comprising: receiving, from a network entity, signaling indicating spatial relation information associated with a plurality of uplink control channel resources, wherein the plurality of uplink control channel resources span a plurality of component carriers; receiving, from the network entity, one or more messages scheduling a first uplink transmission over a first uplink control channel resource of the plurality of uplink control channel resources associated with a first component carrier and a second uplink transmission over a second uplink control channel resource of the plurality of uplink control channel resources associated with a second component carrier, wherein the first uplink control channel resource and the second uplink control channel resource overlap in time; and transmitting, based at least in part on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

Aspect 2: The method of aspect 1, wherein receiving the signaling indicating the spatial relation information associated with the plurality of uplink control channel resources comprises: receiving an indication of a same spatial relation information for both the first uplink control channel resource and the second uplink control channel resource based at least in part on the spatial relation configuration and as a result of the first uplink control channel resource and the second uplink control channel resource overlapping in time.

Aspect 3: The method of aspect 2, wherein transmitting the first uplink transmission over the first uplink control channel resource and the second uplink transmission over the second uplink control channel resource comprises: transmitting the first uplink transmission over the first uplink control channel resource and the second uplink transmission over the second uplink control channel resource via a same directional beam associated with the same spatial relation information.

Aspect 4: The method of any of aspects 2 through 3, wherein the spatial relation configuration defines that uplink control channel resources of the plurality of uplink control channel resources that overlap in time and are associated with different component carriers are configured with same spatial relation information.

Aspect 5: The method of aspect 1, wherein receiving the signaling indicating the spatial relation information associated with the plurality of uplink control channel resources comprises: receiving an indication of a first spatial relation information for the first uplink control channel resource and a second spatial relation information for the second uplink control channel resource.

Aspect 6: The method of aspect 5, further comprising: selecting the first spatial relation information for both the first uplink control channel resource and the second uplink control channel resource based at least in part on the spatial relation configuration and as a result of the first uplink control channel resource and the second uplink control channel resource overlapping in time, wherein transmitting the first uplink transmission over the first uplink control channel resource and the second uplink transmission over the second uplink control channel resource is based at least in part on selecting the first spatial relation information for both the first uplink control channel resource and the second uplink control channel resource.

Aspect 7: The method of aspect 6, wherein transmitting the first uplink transmission over the first uplink control channel resource and the second uplink transmission over the second uplink control channel resource comprises: transmitting the first uplink transmission over the first uplink control channel resource and the second uplink transmission over the second uplink control channel resource via a directional beam associated with the first spatial relation information.

Aspect 8: The method of any of aspects 6 or 7, wherein the spatial relation configuration defines a priority for each of the plurality of component carriers, and the first spatial relation information is selected as a result of the first component carrier associated with the first uplink control channel resource having a relatively higher priority than the second component carrier associated with the second uplink control channel resource.

Aspect 9: The method of any of aspects 5 through 8, further comprising: transmitting, to the network entity, signaling indicating a mapping between a first set of spatial relation information including the first spatial relation information and a first antenna panel of the UE and between a second set of spatial relation information including the second spatial relation information and a second antenna panel of the UE, wherein receiving the indication of the first spatial relation information for the first uplink control channel resource and the second spatial relation information for the second uplink control channel resource is based at least in part on the mapping.

Aspect 10: The method of aspect 9, wherein transmitting the first uplink transmission over the first uplink control channel resource and the second uplink transmission over the second uplink control channel resource comprises: transmitting the first uplink transmission over the first uplink control channel resource via a first directional beam associated with the first spatial relation information; and transmitting the second uplink transmission over the second uplink control channel resource via a second directional beam associated with the second spatial relation information.

Aspect 11: The method of any of aspects 1 through 10, wherein receiving the signaling indicating the spatial relation information associated with the plurality of uplink control channel resources comprises: receiving an indication of one or more fallback spatial relation information corresponding to the spatial relation configuration, each fallback spatial relation information for at least one slot of a number of slots.

Aspect 12: The method of aspect 11, further comprising: selecting a first fallback spatial relation information for both the first uplink control channel resource and the second uplink control channel resource based at least in part on the spatial relation configuration and as a result of the first uplink control channel resource and the second uplink control channel resource overlapping in a first slot, wherein transmitting the first uplink transmission over the first uplink control channel resource and the second uplink transmission over the second uplink control channel resource is based at least in part on selecting the first fallback spatial relation information for both the first uplink control channel resource and the second uplink control channel resource.

Aspect 13: The method of aspect 12, wherein transmitting the first uplink transmission over the first uplink control channel resource and the second uplink transmission over the second uplink control channel resource comprises: transmitting the first uplink transmission over the first uplink control channel resource and the second uplink transmission over the second uplink control channel resource via a directional beam associated with the first fallback spatial relation information.

Aspect 14: The method of any of aspects 1 through 13, further comprising: transmitting, to the network entity, a capability report indicating one or both of a first one or more pairs of uplink control channel resources over which the UE is capable of simultaneous uplink transmissions using different spatial relation information or a second one or more pairs of uplink control channel resources over which the UE is incapable of simultaneous uplink transmissions using different spatial relation information, wherein receiving one or both of the signaling or the one or more messages scheduling the first uplink transmission and the second uplink transmission is based at least in part on the capability report.

Aspect 15: A method for wireless communication at network entity, comprising: transmitting, to a UE, signaling indicating spatial relation information associated with a plurality of uplink control channel resources, wherein the plurality of uplink control channel resources span a plurality of component carriers; transmitting, to the UE, one or more messages scheduling a first uplink transmission over a first uplink control channel resource of the plurality of uplink control channel resources associated with a first component carrier and a second uplink transmission over a second uplink control channel resource of the plurality of uplink control channel resources associated with a second component carrier, wherein the first uplink control channel resource and the second uplink control channel resource overlap in time; and receiving, via one or more components of the network entity and based at least in part on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers.

Aspect 16: The method of aspect 15, wherein transmitting the signaling indicating the spatial relation information associated with the plurality of uplink control channel resources comprises: transmitting an indication of a same spatial relation information for both the first uplink control channel resource and the second uplink control channel resource based at least in part on the spatial relation configuration and as a result of the first uplink control channel resource and the second uplink control channel resource overlapping in time.

Aspect 17: The method of aspect 16, wherein receiving the first uplink transmission over the first uplink control channel resource and the second uplink transmission over the second uplink control channel resource comprises: receiving the first uplink transmission over the first uplink control channel resource and the second uplink transmission over the second uplink control channel resource via a same directional beam associated with the same spatial relation information.

Aspect 18: The method of any of aspects 16 or 17, wherein the spatial relation configuration defines that uplink control channel resources of the plurality of uplink control channel resources that overlap in time and are associated with different component carriers are configured with same spatial relation information.

Aspect 19: The method of aspect 15, wherein transmitting the signaling indicating the spatial relation information associated with the plurality of uplink control channel resources comprises: transmitting an indication of a first spatial relation information for the first uplink control channel resource and a second spatial relation information for the second uplink control channel resource.

Aspect 20: The method of aspect 19, further comprising: selecting the first spatial relation information for both the first uplink control channel resource and the second uplink control channel resource based at least in part on the spatial relation configuration and as a result of the first uplink control channel resource and the second uplink control channel resource overlapping in time, wherein receiving the first uplink transmission over the first uplink control channel resource and the second uplink transmission over the second uplink control channel resource is based at least in part on selecting the first spatial relation information for both the first uplink control channel resource and the second uplink control channel resource.

Aspect 21: The method of aspect 20, wherein receiving the first uplink transmission over the first uplink control channel resource and the second uplink transmission over the second uplink control channel resource comprises: receiving the first uplink transmission over the first uplink control channel resource and the second uplink transmission over the second uplink control channel resource via a directional beam associated with the first spatial relation information.

Aspect 22: The method of any of aspects 20 or 21, wherein the spatial relation configuration defines a priority for each of the plurality of component carriers, and the first spatial relation information is selected as a result of the first component carrier associated with the first uplink control channel resource having a relatively higher priority than the second component carrier associated with the second uplink control channel resource.

Aspect 23: The method of any of aspects 19 through 22, further comprising: receiving, from the UE, signaling indicating a mapping between a first set of spatial relation information including the first spatial relation information and a first antenna panel of the UE and between a second set of spatial relation information including the second spatial relation information and a second antenna panel of the UE, wherein transmitting the indication of the first spatial relation information for the first uplink control channel resource and the second spatial relation information for the second uplink control channel resource is based at least in part on the mapping.

Aspect 24: The method of aspect 23, wherein receiving the first uplink transmission over the first uplink control channel resource and the second uplink transmission over the second uplink control channel resource comprises: receiving, via a first component of the one or more components of the network entity, the first uplink transmission over the first uplink control channel resource via a first directional beam associated with the first spatial relation information; and receiving, via a second component of the one or more components of the network entity, the second uplink transmission over the second uplink control channel resource via a second directional beam associated with the second spatial relation information.

Aspect 25: The method of any of aspects 15 through 24, wherein transmitting the signaling indicating the spatial relation information associated with the plurality of uplink control channel resources comprises: transmitting an indication of one or more fallback spatial relation information corresponding to the spatial relation configuration, each fallback spatial relation information for at least one slot of a number of slots.

Aspect 26: The method of aspect 25, further comprising: selecting a first fallback spatial relation information for both the first uplink control channel resource and the second uplink control channel resource based at least in part on the spatial relation configuration and as a result of the first uplink control channel resource and the second uplink control channel resource overlapping in a first slot, wherein receiving the first uplink transmission over the first uplink control channel resource and the second uplink transmission over the second uplink control channel resource is based at least in part on selecting the first fallback spatial relation information for both the first uplink control channel resource and the second uplink control channel resource.

Aspect 27: The method of aspect 26, wherein receiving the first uplink transmission over the first uplink control channel resource and the second uplink transmission over the second uplink control channel resource comprises: receiving the first uplink transmission over the first uplink control channel resource and the second uplink transmission over the second uplink control channel resource via a directional beam associated with the first fallback spatial relation information.

Aspect 28: The method of any of aspects 15 through 27, further comprising: receiving, from the UE, a capability report indicating one or both of a first one or more pairs of uplink control channel resources over which the UE is capable of simultaneous uplink transmissions using different spatial relation information and a second one or more pairs of uplink control channel resources over which the UE is incapable of simultaneous uplink transmissions using different spatial relation information, wherein transmitting one or both of the signaling or the one or more messages scheduling the first uplink transmission and the second uplink transmission is based at least in part on the capability report.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at network entity, comprising a processor; memory coupled with the processor; and instructions stored in the memory and executable by the processor to cause the apparatus to perform a method of any of aspects 15 through 28.

Aspect 33: An apparatus for wireless communication at network entity, comprising at least one means for performing a method of any of aspects 15 through 28.

Aspect 34: A non-transitory computer-readable medium storing code for wireless communication at network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a network entity, signaling indicating spatial relation information associated with a plurality of uplink control channel resources, wherein the plurality of uplink control channel resources span a plurality of component carriers, wherein the spatial relation information comprises spatial relation information for a first uplink control channel resource of the plurality of uplink control channel resources and spatial relation information for a second uplink control channel resource of the plurality of uplink control channel resources;

receiving, from the network entity, one or more messages scheduling a first uplink transmission over the first uplink control channel resource of the plurality of uplink control channel resources associated with a first component carrier and a second uplink transmission over the second uplink control channel resource of the plurality of uplink control channel resources associated with a second component carrier, wherein the first uplink control channel resource and the second uplink control channel resource overlap in time; and transmitting, based at least in part on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers, wherein the spatial relation information for the first uplink control channel resource and the spatial relation information for the second uplink control channel resource are selected to be a same spatial relation information according to the spatial relation configuration defining that the spatial relation information for the first uplink control channel resource and the spatial relation information for the second uplink control channel resource are the same as a result of the first uplink control channel resource and the second uplink control channel resource overlapping in time.

2. The method of claim 1, wherein transmitting the first uplink transmission over the first uplink control channel resource and the second uplink transmission over the second uplink control channel resource comprises:

transmitting the first uplink transmission over the first uplink control channel resource and the second uplink transmission over the second uplink control channel resource via a same directional beam associated with the same spatial relation information.

3. The method of claim 1, wherein the spatial relation configuration defines that uplink control channel resources of the plurality of uplink control channel resources that overlap in time and are associated with different component carriers are configured with same spatial relation information.

4. The method of claim 1, wherein receiving the signaling indicating the spatial relation information associated with the plurality of uplink control channel resources comprises:
receiving an indication of one or more fallback spatial relation information corresponding to the spatial relation configuration, each fallback spatial relation information for at least one slot of a number of slots.

5. The method of claim 4, further comprising:
selecting a first fallback spatial relation information for both the first uplink control channel resource and the second uplink control channel resource based at least in part on the spatial relation configuration and as a result of the first uplink control channel resource and the second uplink control channel resource overlapping in a first slot, wherein transmitting the first uplink transmission over the first uplink control channel resource and the second uplink transmission over the second uplink control channel resource is based at least in part on selecting the first fallback spatial relation information for both the first uplink control channel resource and the second uplink control channel resource.

6. The method of claim 5, wherein transmitting the first uplink transmission over the first uplink control channel resource and the second uplink transmission over the second uplink control channel resource comprises:
transmitting the first uplink transmission over the first uplink control channel resource and the second uplink transmission over the second uplink control channel resource via a directional beam associated with the first fallback spatial relation information.

7. The method of claim 1, further comprising:
transmitting, to the network entity, a capability report indicating one or both of a first one or more pairs of uplink control channel resources over which the UE is capable of simultaneous uplink transmissions using different spatial relation information or a second one or more pairs of uplink control channel resources over which the UE is incapable of simultaneous uplink transmissions using different spatial relation information, wherein receiving one or both of the signaling or the one or more messages scheduling the first uplink transmission and the second uplink transmission is based at least in part on the capability report.

8. A method for wireless communication at a network entity, comprising:
transmitting, to a user equipment (UE), signaling indicating spatial relation information associated with a plurality of uplink control channel resources, wherein the plurality of uplink control channel resources span a plurality of component carriers, wherein the spatial relation information comprises spatial relation information for a first uplink control channel resource of the plurality of uplink control channel resources and spatial relation information for a second uplink control channel resource of the plurality of uplink control channel resources;

transmitting, to the UE, one or more messages scheduling a first uplink transmission over the first uplink control channel resource of the plurality of uplink control channel resources associated with a first component carrier and a second uplink transmission over the second uplink control channel resource of the plurality of uplink control channel resources associated with a second component carrier, wherein the first uplink control channel resource and the second uplink control channel resource overlap in time; and
receiving, via one or more components of the network entity and based at least in part on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers, wherein the spatial relation information for the first uplink control channel resource and the spatial relation information for the second uplink control channel resource are selected to be a same spatial relation information according to the spatial relation configuration defining that the spatial relation information for the first uplink control channel resource and the spatial relation information for the second uplink control channel resource are the same as a result of the first uplink control channel resource and the second uplink control channel resource overlapping in time.

9. The method of claim 8, wherein receiving the first uplink transmission over the first uplink control channel resource and the second uplink transmission over the second uplink control channel resource comprises:
receiving the first uplink transmission over the first uplink control channel resource and the second uplink transmission over the second uplink control channel resource via a same directional beam associated with the same spatial relation information.

10. The method of claim 8, wherein the spatial relation configuration defines that uplink control channel resources of the plurality of uplink control channel resources that overlap in time and are associated with different component carriers are configured with same spatial relation information.

11. The method of claim 8, wherein transmitting the signaling indicating the spatial relation information associated with the plurality of uplink control channel resources comprises:
transmitting an indication of one or more fallback spatial relation information corresponding to the spatial relation configuration, each fallback spatial relation information for at least one slot of a number of slots.

12. The method of claim 11, further comprising:
selecting a first fallback spatial relation information for both the first uplink control channel resource and the second uplink control channel resource based at least in part on the spatial relation configuration and as a result of the first uplink control channel resource and the second uplink control channel resource overlapping in a first slot, wherein receiving the first uplink transmission over the first uplink control channel resource and the second uplink transmission over the second uplink control channel resource is based at least in part on selecting the first fallback spatial relation information for both the first uplink control channel resource and the second uplink control channel resource.

13. The method of claim 12, wherein receiving the first uplink transmission over the first uplink control channel resource and the second uplink transmission over the second uplink control channel resource comprises:
receiving the first uplink transmission over the first uplink control channel resource and the second uplink transmission over the second uplink control channel resource via a directional beam associated with the first fallback spatial relation information.

14. The method of claim 8, further comprising:
receiving, from the UE, a capability report indicating one or both of a first one or more pairs of uplink control channel resources over which the UE is capable of simultaneous uplink transmissions using different spatial relation information and a second one or more pairs of uplink control channel resources over which the UE is incapable of simultaneous uplink transmissions using different spatial relation information, wherein transmitting one or both of the signaling or the one or more messages scheduling the first uplink transmission and the second uplink transmission is based at least in part on the capability report.

15. An apparatus for wireless communication at a user equipment (UE), comprising:
one or more processors;
memory coupled with the one or more processors; and
instructions stored in the memory and executable by the one or more processors to cause the apparatus to:
receive, from a network entity, signaling indicating spatial relation information associated with a plurality of uplink control channel resources, wherein the plurality of uplink control channel resources span a plurality of component carriers, wherein the spatial relation information comprises spatial relation information for a first uplink control channel resource of the plurality of uplink control channel resources and spatial relation information for a second uplink control channel resource of the plurality of uplink control channel resources;
receive, from the network entity, one or more messages scheduling a first uplink transmission over the first uplink control channel resource of the plurality of uplink control channel resources associated with a first component carrier and a second uplink transmission over the second uplink control channel resource of the plurality of uplink control channel resources associated with a second component carrier, wherein the first uplink control channel resource and the second uplink control channel resource overlap in time; and
transmit, based at least in part on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers, wherein the spatial relation information for the first uplink control channel resource and the spatial relation information for the second uplink control channel resource are selected to be a same spatial relation information according to the spatial relation configuration defining that the spatial relation information for the first uplink control channel resource and the spatial relation information for the second uplink control channel resource are the same as a result of the first uplink control channel resource and the second uplink control channel resource overlapping in time.

16. The apparatus of claim 15, wherein, to transmit the first uplink transmission over the first uplink control channel resource and the second uplink transmission over the second uplink control channel resource, the instructions are further executable by the one or more processors to cause the apparatus to:
transmit the first uplink transmission over the first uplink control channel resource and the second uplink transmission over the second uplink control channel resource via a same directional beam associated with the same spatial relation information.

17. The apparatus of claim 15, wherein the spatial relation configuration defines that uplink control channel resources of the plurality of uplink control channel resources that overlap in time and are associated with different component carriers are configured with same spatial relation information.

18. The apparatus of claim 15, wherein, to receive the signaling indicating the spatial relation information associated with the plurality of uplink control channel resources, the instructions are further executable by the one or more processors to cause the apparatus to:
receive an indication of one or more fallback spatial relation information corresponding to the spatial relation configuration, each fallback spatial relation information for at least one slot of a number of slots.

19. The apparatus of claim 18, wherein the instructions are further executable by the one or more processors to cause the apparatus to:
select a first fallback spatial relation information for both the first uplink control channel resource and the second uplink control channel resource based at least in part on the spatial relation configuration and as a result of the first uplink control channel resource and the second uplink control channel resource overlapping in a first slot, wherein transmitting the first uplink transmission over the first uplink control channel resource and the second uplink transmission over the second uplink control channel resource is based at least in part on selecting the first fallback spatial relation information for both the first uplink control channel resource and the second uplink control channel resource.

20. The apparatus of claim 19, wherein, to transmit the first uplink transmission over the first uplink control channel resource and the second uplink transmission over the second uplink control channel resource, the instructions are further executable by the one or more processors to cause the apparatus to:
transmit the first uplink transmission over the first uplink control channel resource and the second uplink transmission over the second uplink control channel resource via a directional beam associated with the first fallback spatial relation information.

21. The apparatus of claim 15, wherein the instructions are further executable by the one or more processors to cause the apparatus to:
transmit, to the network entity, a capability report indicating one or both of a first one or more pairs of uplink control channel resources over which the UE is capable of simultaneous uplink transmissions using different spatial relation information or a second one or more pairs of uplink control channel resources over which the UE is incapable of simultaneous uplink transmissions using different spatial relation information, wherein receiving one or both of the signaling or the one or more messages scheduling the first uplink transmission and the second uplink transmission is based at least in part on the capability report.

22. An apparatus for wireless communication at a network entity, comprising:
one or more processors;
memory coupled with the one or more processors; and
instructions stored in the memory and executable by the one or more processors to cause the apparatus to:
transmit, to a user equipment (UE), signaling indicating spatial relation information associated with a plurality of uplink control channel resources, wherein the plurality of uplink control channel resources span a plurality of component carriers, wherein the spatial relation information comprises spatial relation information for a first uplink control channel resource of the plurality of uplink control channel resources and spatial relation information for a second uplink control channel resource of the plurality of uplink control channel resources;
transmit, to the UE, one or more messages scheduling a first uplink transmission over the first uplink control channel resource of the plurality of uplink control channel resources associated with a first component carrier and a second uplink transmission over the second uplink control channel resource of the plurality of uplink control channel resources associated with a second component carrier, wherein the first uplink control channel resource and the second uplink control channel resource overlap in time; and
receive, via one or more components of the network entity and based at least in part on the spatial relation information, the first uplink transmission over the first uplink control channel resource and the second uplink transmission over the second uplink control channel resource in accordance with a spatial relation configuration for simultaneous uplink transmissions over uplink control channel resources spanning multiple component carriers, wherein the spatial relation information for the first uplink control channel resource and the spatial relation information for the second uplink control channel resource are selected to be a same spatial relation information according to the spatial relation configuration defining that the spatial relation information for the first uplink control channel resource and the spatial relation information for the second uplink control channel resource are the same as a result of the first uplink control channel resource and the second uplink control channel resource overlapping in time.

23. The apparatus of claim 22, wherein, to receive the first uplink transmission over the first uplink control channel resource and the second uplink transmission over the second uplink control channel resource, the instructions are further executable by the one or more processors to cause the apparatus to:
receive the first uplink transmission over the first uplink control channel resource and the second uplink transmission over the second uplink control channel resource via a same directional beam associated with the same spatial relation information.

24. The apparatus of claim 22, wherein the spatial relation configuration defines that uplink control channel resources of the plurality of uplink control channel resources that overlap in time and are associated with different component carriers are configured with same spatial relation information.

25. The apparatus of claim 22, wherein, to transmit the signaling indicating the spatial relation information associated with the plurality of uplink control channel resources, the instructions are further executable by the one or more processors to cause the apparatus to:
transmit an indication of one or more fallback spatial relation information corresponding to the spatial relation configuration, each fallback spatial relation information for at least one slot of a number of slots.

26. The apparatus of claim 25, wherein the instructions are further executable by the one or more processors to cause the apparatus to:
select a first fallback spatial relation information for both the first uplink control channel resource and the second uplink control channel resource based at least in part on the spatial relation configuration and as a result of the first uplink control channel resource and the second uplink control channel resource overlapping in a first slot, wherein receiving the first uplink transmission over the first uplink control channel resource and the second uplink transmission over the second uplink control channel resource is based at least in part on selecting the first fallback spatial relation information for both the first uplink control channel resource and the second uplink control channel resource.

27. The apparatus of claim 26, wherein, to receive the first uplink transmission over the first uplink control channel resource and the second uplink transmission over the second uplink control channel resource, the instructions are further executable by the one or more processors to cause the apparatus to:
receive the first uplink transmission over the first uplink control channel resource and the second uplink transmission over the second uplink control channel resource via a directional beam associated with the first fallback spatial relation information.

28. The apparatus of claim 22, wherein the instructions are further executable by the one or more processors to cause the apparatus to:
receive, from the UE, a capability report indicating one or both of a first one or more pairs of uplink control channel resources over which the UE is capable of simultaneous uplink transmissions using different spatial relation information and a second one or more pairs of uplink control channel resources over which the UE is incapable of simultaneous uplink transmissions using different spatial relation information, wherein transmitting one or both of the signaling or the one or more messages scheduling the first uplink transmission and the second uplink transmission is based at least in part on the capability report.

* * * * *